United States Patent
Pratt et al.

(10) Patent No.: US 12,035,134 B2
(45) Date of Patent: Jul. 9, 2024

(54) SECURITY FOR WIRELESS COMMUNICATIONS

(71) Applicant: University of Notre Dame du Lac, South Bend, IN (US)

(72) Inventors: Thomas G. Pratt, South Bend, IN (US); Joseph Lawrence Loof, South Bend, IN (US); Eric Jesse, South Bend, IN (US)

(73) Assignee: University of Notre Dame du Lac, South Bend, IN (US)

( * ) Notice: Subject to any disclaimer, the term of this patent is extended or adjusted under 35 U.S.C. 154(b) by 481 days.

(21) Appl. No.: 17/126,762

(22) PCT Filed: Jun. 19, 2019

(86) PCT No.: PCT/US2019/038030
§ 371 (c)(1),
(2) Date: Dec. 19, 2020

(87) PCT Pub. No.: WO2020/068198
PCT Pub. Date: Apr. 2, 2020

(65) Prior Publication Data
US 2021/0204122 A1    Jul. 1, 2021

Related U.S. Application Data

(60) Provisional application No. 62/687,135, filed on Jun. 19, 2018.

(51) Int. Cl.
*H04W 12/06* (2021.01)
*H04B 7/10* (2017.01)
*H04W 12/79* (2021.01)

(52) U.S. Cl.
CPC .............. *H04W 12/06* (2013.01); *H04B 7/10* (2013.01); *H04W 12/79* (2021.01)

(58) Field of Classification Search
CPC ............................ H04W 12/06; H04W 12/79
See application file for complete search history.

(56) References Cited

U.S. PATENT DOCUMENTS 3,919,479 A * 11/1975 Moon .................... H04H 60/56
  455/39
5,420,910 A *  5/1995 Rudokas ............... H04W 12/06
  455/410

(Continued)

FOREIGN PATENT DOCUMENTS

WO    2016068933 A1    5/2016

OTHER PUBLICATIONS

Poddar et al., "Machine Learning with Watermarked Weights.", U.S. Appl. No. 62/612,274, filed Dec. 29, 2017 (Year: 2017).*

(Continued)

*Primary Examiner* — Kari L Schmidt
(74) *Attorney, Agent, or Firm* — ICE MILLER LLP

(57) ABSTRACT

Devices and techniques for authenticating wireless communications are disclosed. In some embodiments, the techniques can be performed by a network access point that includes a receiver to receive a wireless signal from a remote device. The network access point can also include a processor to calculate polarization data for the wireless signal and to determine whether the polarization data includes at least one characteristic that corresponds to a characteristic of a stored authenticated polarization signature.

19 Claims, 12 Drawing Sheets

(56) References Cited

U.S. PATENT DOCUMENTS

| | | | | |
|---|---|---|---|---|
| 7,929,409 B2* | 4/2011 | Chitrapu | ............... | H04L 1/0061 370/208 |
| 8,095,974 B2* | 1/2012 | Aaron | ................... | G06F 21/31 726/17 |
| 9,673,920 B2* | 6/2017 | Sen | .................... | H04L 63/1433 |
| 10,609,023 B2* | 3/2020 | Kim | ................ | H04L 63/0861 |
| 10,644,883 B2* | 5/2020 | Ahn | ................ | H04L 63/08 |
| 2005/0180315 A1* | 8/2005 | Chitrapu | ............... | H04L 1/0606 370/208 |
| 2009/0315792 A1* | 12/2009 | Miyashita | ............ | H01Q 21/245 343/742 |
| 2010/0050259 A1* | 2/2010 | Christofferson | ....... | H04H 20/12 726/23 |
| 2010/0100936 A1* | 4/2010 | Brik | ........................ | H04L 47/20 726/23 |
| 2012/0029718 A1* | 2/2012 | Davis | ..................... | G05B 15/02 706/12 |
| 2013/0159722 A1* | 6/2013 | Goergen | ............ | H04N 1/32144 713/176 |
| 2013/0172007 A1* | 7/2013 | Wax | ...................... | G01S 5/0252 455/456.1 |
| 2013/0285855 A1* | 10/2013 | Dupray | ................. | H04W 4/029 342/451 |
| 2013/0332115 A1* | 12/2013 | Pratt | ...................... | G01N 22/04 702/189 |
| 2015/0135293 A1* | 5/2015 | Mookiah | ............. | H04L 63/1483 726/23 |
| 2015/0230105 A1* | 8/2015 | Negus | .................. | H04W 72/20 370/329 |
| 2016/0277899 A1* | 9/2016 | Persson | ............... | H04W 64/006 |
| 2017/0019193 A1* | 1/2017 | Pratt | ............... | H04B 17/12 |
| 2017/0324553 A1* | 11/2017 | Ahn | ...................... | H04L 9/0869 |
| 2019/0131023 A1* | 5/2019 | Littmann | .................. | G09F 3/02 |
| 2019/0205508 A1* | 7/2019 | Poddar | .................. | G06N 3/045 |
| 2020/0322796 A1* | 10/2020 | Xie | ....................... | H04W 12/06 |
| 2023/0361996 A1* | 11/2023 | Balmakhtar | ........ | H04L 9/0858 |

OTHER PUBLICATIONS

Al-Hamdani, W. A. (Sep. 2011). Elliptic curve for data protection. In Proceedings of the 2011 Information Security Curriculum Development Conference (pp. 1-14). (Year: 2011).*

J. G. Mueller and T. G. Pratt, "Comparison of RF Remote Sensing Vibrometry Focusing on Polarization Mode Dispersion," in IEEE Sensors Journal, vol. 16, No. 6, pp. 1586-1596, Mar. 15, 2016. (Year: 2016).*

Wu, Yuemei, et al. "Physical Layer Authentication Based on Channel Polarization Response in Dual-Polarized Antenna Communication Systems." IEEE Transactions on Information Forensics and Security 18 (2023): 2144-2159. (Year: 2023).*

International Bureau of WIPO, International Preliminary Report on Patentability for International Application No. PCT/US2019/038030, dated Dec. 30, 2020.

Suhas Mathur et al., Exploiting the physical layer for enhanced security [Security and Privacy in Emerging Wireless Networks], In: IEEE Wireless Communications, vol. 17, Issue 5, pp. 63-70, Oct. 14, 2010.

* cited by examiner

SECURITY FOR WIRELESS COMMUNICATIONS

INCORPORATION BY REFERENCE TO ANY PRIORITY APPLICATIONS

This application claims priority to U.S. Provisional Patent Application No. 62/687,135, filed Jun. 19, 2018, and entitled "RADIO FREQUENCY SIGNATURE FOR WIRELESS DEVICES" which is hereby incorporated by reference in its entirety.

STATEMENT REGARDING FEDERALLY SPONSORED R&D

This invention was made with United States government support under grant N00014-15-1-2010 awarded by the Office of Naval Research. The United States government has certain rights in the invention.

BACKGROUND

Field

The field of the invention relates to securing wireless communications.

Description of the Related Art

Electronic devices can be used for a wide variety of purposes, including to collect data and operate equipment and appliances. In growing numbers, these devices employ wireless networks to communicate with applications and send data to users. A homeowner, for instance, might receive notice on their smartphone that their washing machine has completed its cycle. The connectivity of such devices is generically referred to as the Internet of Things (IoT).

Projections for growth in the number of devices in the Internet of Things varies considerably, ranging from 20 billion devices to 31 billion total installed devices by 2020, with past projections being as high as 50 billion. Industrial applications represent a significant part of these projections. Refineries and plants use these devices to gather data and operate equipment throughout their processes.

Each of these devices, also known as endpoints when they are at the farthest reaches of a network, is a potential entry point for malicious actors to gain access to the network and servers. If malicious software is successfully installed, significant damage can result, causing plant downtime and even loss of life. Research has found that industrial cyber-attacks and cybersecurity issues occur on a regular basis.

Faced with the challenges of cyber-attacks on industrial endpoints, control systems engineers are seeking ways to secure their networks. In some cases, they are moving to methods involving isolation. They create zones of protection which have limited ability to communicate with other zones. Such zones may communicate with a proprietary corporate network through a diode gateway, for instance, allowing communication from a device, which resides in an operational technology network, to the business side, residing in an information technology network. The diode gateway allows data to flow from the device to the business side, but not from the business side to the device. These methods of isolation, however, seem to run counter to the concepts inherent in Big Data applications, where information flows freely between all nodes.

It would be more advantageous to offer an alternative: device authentication, for example, at levels 0 and 1 in the Purdue Model for Control Hierarchy. Level 0, being the lowest, refers to the sensors and instrumentation that directly connect to the manufacturing process and monitor it. Level 1 refers to the basic controls that operate based on the inputs from the sensors and instrumentation. In a simple example, a temperature sensor serves as a device in Level 0, while a thermostat serves in Level 1. Distributed control systems, programmable logic controllers and remote terminal units are all Level 1 devices, as well. Such devices have been used by industry for decades. In fact, that is one of the problems in securing endpoint communications. Since there are so many legacy endpoint devices of different types, it is a logistical and technical challenge to regularly patch operating software, update security protocols, periodically change passwords, etc. Further, many such legacy endpoint devices do not have updatable software and/or do not possess security protocols at all.

IoT networks often use wireless communication. Wireless endpoint security can be challenging due to the variety of wireless technologies and protocols. In addition, wireless networks can be compromised by attackers who are in relatively close physical proximity but do not have direct physical access to the equipment. Security threats to IoT networks can come from numerous sources, including hostile governments, terrorist groups, disgruntled employees, malicious intruders, etc. using, for example, spoofing, distributed denial of service (DDoS) attacks, key reinstallation attacks (KRACK), man-in-the-middle attacks, etc. In industrial, medical, or consumer settings, these attacks can lead to shutdowns, dangerous conditions, compromised private data, financial loss, or even loss of life.

The rapid growth of wireless devices employed in the Internet of Things is causing concern for proper cybersecurity. Industry finds itself particularly vulnerable due to older, legacy devices found in plants and refineries. There is therefore a need for improved techniques for securing wireless communications.

SUMMARY

This application describes techniques for authenticating devices that employ wireless communications. This can be done based on characteristics of the wireless signals, such as unique signal polarization features resulting from effects of antenna type and/or orientation, as well as the multipath environment between the transmitter and receiver.

When a wireless signal is transmitted from a device to an access point, like a router, it typically does not follow a single line of sight (LOS) path but rather multiple paths, often reflecting or scattering from objects in between. In such multipath channels, transmitted wireless signals arriving at a receiver may be uniquely identifiable by certain characteristics of the signal, such as polarization features. This is described in U.S. Patent Publication 2017/0019193, filed Apr. 20, 2016, and entitled "USE OF COHERENT SIGNAL DISPERSION FOR SIGNAL SOURCE ASSOCIATION," the entirety of which is hereby incorporated by reference herein.

In particular, aggregate polarization features induced by a multipath channel are found to be stable for fixed devices communicating wirelessly in a static environment. Therefore, they can provide a means to authenticate devices. In addition, by tracking these polarization features over time, they can also be used to authenticate mobile devices in a changing environment. These signatures consist of signal polarization features based on antenna characteristics as well as the multipath signal reflections from transmitter to receiver.

As a consequence of the effects induced by the multipath channel, the received signal will exhibit polarization features that are a function of frequency across the signal bandwidth, a function that is typically smooth in nature. This is called polarization mode dispersion (PMD). The result is a unique PMD signature that looks like a meandering line when plotted on a Poincaré Sphere—a coordinate system that is commonly used to illustrate polarization. These signatures are distinct for each device, even if the devices happen to be physically located in close proximity. Polarization mode dispersion signatures can be used to authenticate a device on a packet-by-packet basis by analyzing channel-induced features of the naturally occurring received waveform. More information is provided in U.S. Patent Publication 2017/0019193, which, again, is incorporated by reference herein in its entirety.

So when considering a real world example, a temperature sensor might send an RF signal to a router. The signal bounces off of many things in between. Each time it bounces, the polarization of the signal may be slightly altered—differently in different frequency subbands. That creates a unique signature for the sensor. Now a hacker tries to emulate the temperature sensor, knowing its media access control (MAC) address and password, but the hacker's signal bounces differently, producing a different signature. When employed as a wireless security solution, this PMD signature-based authentication can be used to make a decision to allow or disallow communication with a device. It could be implemented in a chipset incorporated into a router. In this demonstration, a router would see a number of devices sending signals to it, none of which are allowed to communicate. Authenticating the known devices allows communication with them. When an attacker attempts to spoof one of the devices, the newly-discovered device is not allowed to communicate. This can be done by the router without demodulating the signal. Encryption is not needed, so the security feature does not consume bandwidth. It works without any wireless protocol. It can be used with old, legacy devices without modifying them. The only change of technology is at the router.

By using a router that includes technology to identify endpoints by their PMD signatures, authentication of wireless endpoint devices can be achieved. This authentication has important benefits. It doesn't require any changes in the endpoint device; thus, older legacy devices can be protected. The absence of required changes to the endpoint device is also advantageous in healthcare, where such changes could cause medical device manufacturers to seek new approval from the United States Federal Drug Administration, requiring new clinical trials and making such desired changes prohibitively expensive. In addition, the user need not rely on the endpoint device manufacturer to keep software up-to-date to prevent malicious actors from spoofing the device to gain access to a network. Unauthenticated devices are simply disallowed from communicating with the network.

This proposed authentication techniques are independent of wireless communication protocol. Thus, they can work as well with IEEE 802.11, ZigBee, Bluetooth Low Energy (BLE), Long Range Wide Area Network (LoRaWAN), Weightless, and Fieldbus protocols, as well as others. The disclosed authentication techniques are technology-agnostic. The disclosed authentication techniques do not interrupt other security methods, so they are compatible with Wireless Protected Access 2 (WPA2) encryption, Advanced Encryption Standard (AES), and even security proprietary to specific manufacturers.

The authentication techniques described herein have been shown to be a credible way to protect older legacy endpoint devices from attack, and may have application for a variety of use cases including: temperature sensors, pressure sensors, smoke sensors, piezo sensors, proximity sensors, control valve position sensors, and even perimeter security cameras. In addition to these common fixed wireless devices, the authentication techniques described herein can apply to mobile wireless devices (e.g., smartphones and tablets) by tracking their PMD signatures over time.

Some mobile endpoints have been found to have operating systems many years old, like Windows NT, which Microsoft ceased supporting over a decade ago, because it is simply too costly to upgrade all control system devices and sensors. The authentication techniques described herein are backward-compatible, however, and do not require software updates for the endpoint devices. Also, any authentication system using a key presents challenges for industry. Keys can be stolen in what is called a man-in-the-middle attack. In this attack, the perpetrator replaces the client's server address with his address. Then, he replaces the client address on the server with his. This places him in the middle between client and server. It should be noted that using the proposed techniques prevents the perpetrator from ever connecting with the server, thus preventing any man-in-the-middle attack.

The authentication techniques described herein can be implemented with only a change in the receiving front-end of an access point. Thus, by changing a router in an industrial environment, one could protect all wireless endpoints from man-in-the-middle attacks, KRACK attacks, and spoofing attacks. Since authentication can be performed on the physical layer, prior to any demodulation of the signal, there is no opportunity for a self-launching attack to be loaded. Thus, the authentication techniques described herein would protect against distributed denial-of-service (DDoS) attacks and Zero-Day attacks as well.

DETAILED DESCRIPTION

Figure 4:
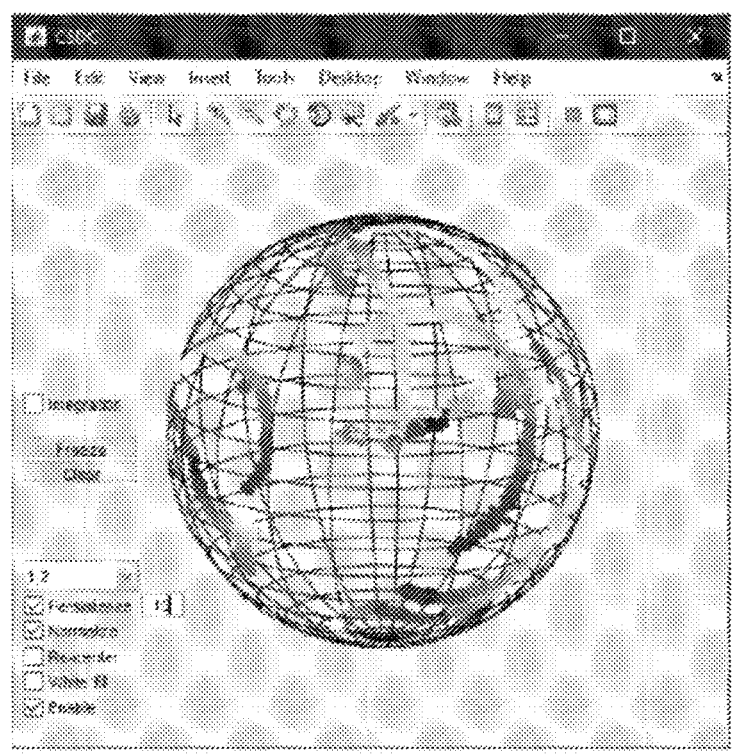
FIG. 4 shows PMD curves associated with different sources, by frequency.
Figure 4:
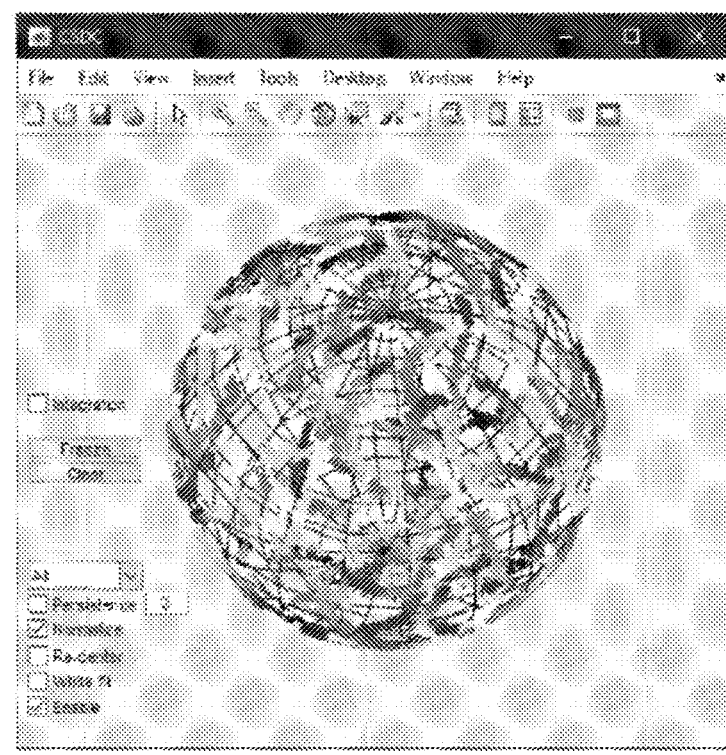
Figure 6:
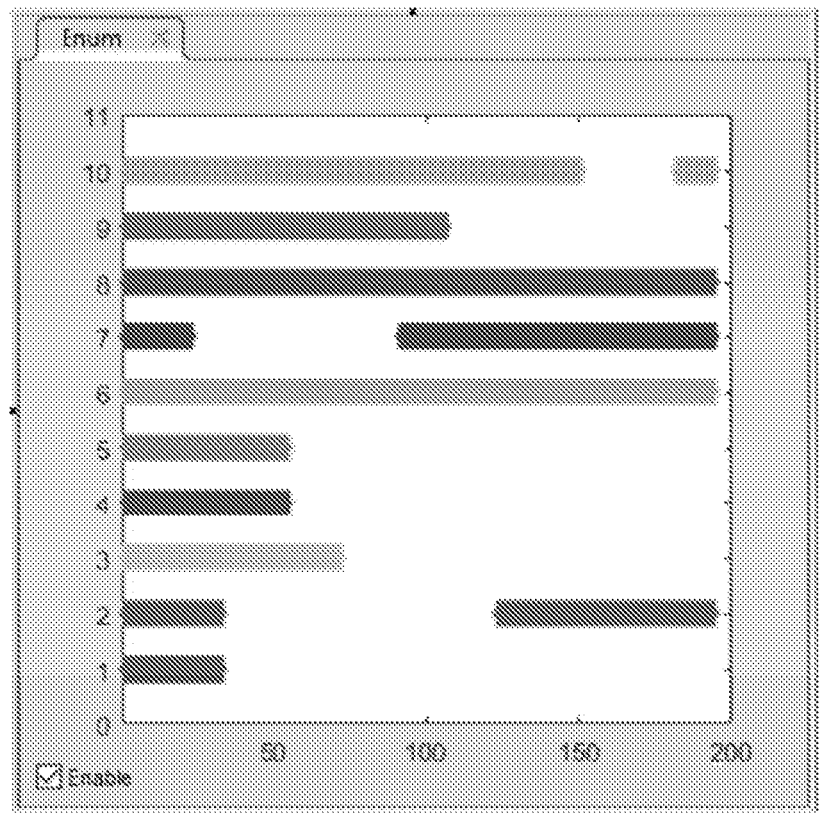
FIG. 6 shows that the system can track which sources are on at any given time. If a source has any signals assigned to it in the given time window, it is declared as "on".

U.S. Patent Publication 2017/0019193 (incorporated by reference herein in its entirety) discloses background material regarding polarization mode dispersion curves (i.e., PMD curves) and coherent signal dispersion curves (i.e., CSD curves), either of which can be used as authentication signatures according to the techniques described herein. It also includes background material regarding Stokes parameters, Poincare spheres, and other related concepts. U.S. Patent Publication 2017/0019193 also discloses devices (e.g., as shown in FIG. 4 and FIG. 6) which can be used to perform the authentication techniques described herein. In addition, any of the techniques described in U.S. Patent Publication 2017/0019193 can be used in combination with any of the techniques described herein.

Blind source separation of frequency-hopped (FH) signals in frequency-selective channels has previously been considered using dispersion responses associated with dual-polarization and space-polarization receiver architectures. These approaches may assume a fixed number of sources and an analysis interval sufficiently long such that all sources have hopped to the full complement of hop frequencies to enable clustering, estimation of source loci, and signal classification. Additionally, the analysis interval in those approaches may generally be smaller than the decorrelation time of the coherency matrices of the source responses. A related approach that may obviate the need for these various requirements is described herein. The approach described herein involves classification of received FH signals and non-FH signals as they are detected and characterized. The method builds up a dynamic library of detected responses, which is updated upon every detection and which effectively tracks signal responses, provided the responses change in a correlated fashion. The method also enumerates the number of distinct sources that have been detected in the environment, even if the sources transmit diverse waveforms over the same frequency band. Confusion matrices that characterize the potential for misassociations among the detected transmissions are estimated based on the dispersion responses, and are a function of the signal-to-noise ratio (SNR) and the number of signal feature manifolds utilized in the space-polarization architecture. Wireless experiments are used to show the efficacy of the technique for the case of ten FH sources, and then for ten non-FH signals. Confusion matrices for both cases are computed for different received signal power levels.

I. Introduction

This application discloses a method for blind source separation (BSS) and enumeration of frequency-hopped (FH) signals in frequency-selective channels with temporal dispersion and angle spread. The method is also shown to have application to non-FH signals. In the literature, various BSS methods have been proposed for FH signals, most often for frequency non-selective channels. Mixing models are one example of a solution suited for frequency non-selective fading channels. Fewer references have addressed the more difficult problem of signal classification in time-dispersive multipath channels, which exhibit frequency-selective channel responses. These methods rely on direction of arrival (DOA) estimation, but assume that each signal exhibits negligible angular spread, which limits the practical use of the techniques. Still fewer methods in literature address the case of multipath with both temporal dispersion and angular spread. The presence of multipath with angular spread presents a challenge to DOA-based techniques since the number of paths and their respective directions usually must be estimated. One BSS method details an approach involving the estimation of angles of arrival (AoA) and multipath propagation delays for the FH signals. The approach requires knowledge of synchronization sequences and assumes ideal synchronization, which limits its application. Direction and time-delay estimates are formed from spatial covariance matrix estimates and temporal covariance matrix estimates, respectively. The number of groups and the number of rays in each group must be determined, for which Akaike information criterion (AIC) or minimum description length (MDL) criterion can be invoked.

In more recent work, such as U.S. Patent Publication 2017/0019193, methods based on signal dispersion features have been proposed. In these works, polarization dispersion and space-polarization features associated with multipath channels are exploited to discriminate signals according to their common source. In contrast to most other works, the efficacy of the approach is implemented and validated in over-the-air experiments. The methods, however, may assume a fixed number of sources and an analysis interval that is sufficiently long such that all sources have hopped to the full complement of hop frequencies. These may be required to enable clustering, estimation of source response loci, and finally classification (signal separation). Additionally, the analysis interval may need to be smaller than the decorrelation time of the coherency matrices of the source responses. To overcome these shortcomings, this application discloses an alternative method that involves classification of received FH signals "on the fly" as they are detected and characterized at the receiver. The method also extends to non-FH signals. In this latter case, a source signal occupies its full frequency range in each pulse, and the dispersion responses associated with the source can be identified entirely from the single pulse. In the processing, with every new received pulse, enumeration and dispersion feature estimates are recomputed so that at any time, the best dispersion source response estimates can be formed. The processing operates using a dynamic library of detections along with each newly detected signal. This approach has the benefit of being able to operate upon an unknown number of signals with unknown and dynamically changing source waveforms. It also updates dispersion responses that change with time.

The remainder of the application is organized as follows. Section II-A presents the signal models for the FH signals and the multipath propagation channel. Next, the principal signal processing algorithms for signal detection and signal feature estimation are discussed in Section III. Signal association and corresponding dynamic library management are described in Section IV. The confusion matrix, which is computed from the measured source dispersion responses to characterize the association performance (and misassociation performance), is presented in Section V. Over-the-air testing is described in Section VI and includes laboratory testing first with ten frequency hopping sources, and then with ten non-FH signal sources. The results illustrate the ability of the approach to achieve BSS in all of these cases, and corresponding results for various SNR conditions are also presented. Conclusions are presented in Section VII.

II. Signal Models

A. Problem Description

Figure 1:
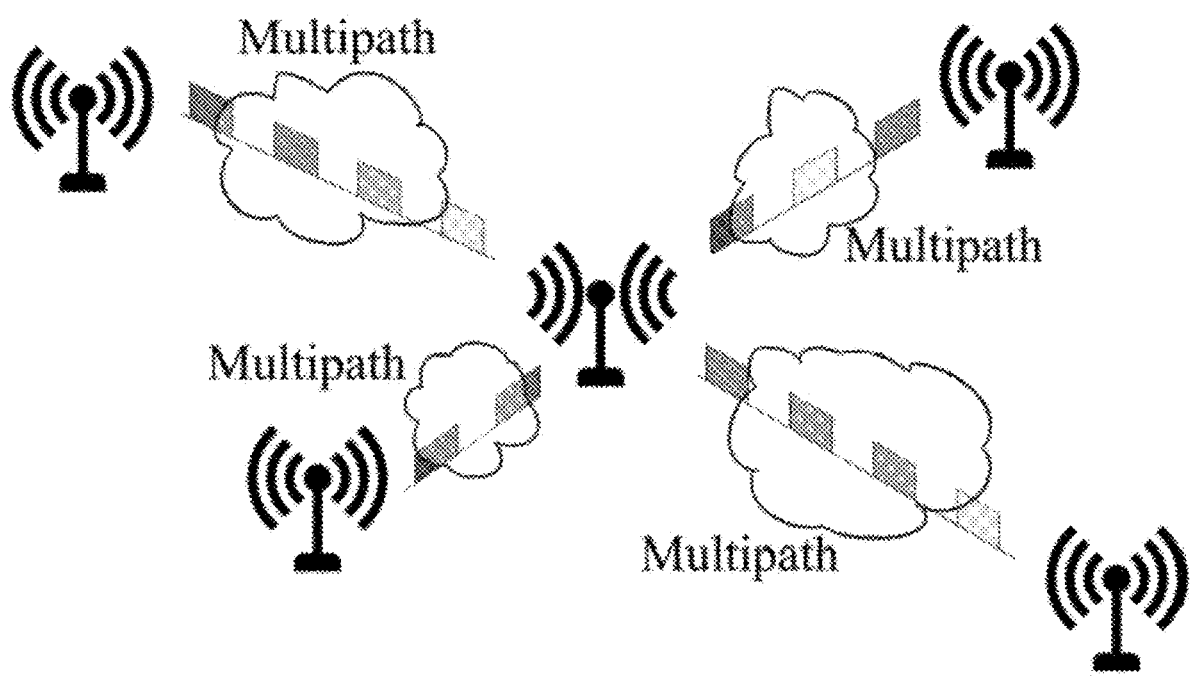
FIG. 1 shows a scenario involving two passive dual-polarized receivers in the vicinity of multiple synchronous frequency hopping signals.

FIG. 1 depicts the problem being considered. FIG. 1 shows a scenario involving two passive dual-polarized receivers in the vicinity of multiple synchronous frequency-hopping signals. A passive sensor is assumed to be in the vicinity of i=1,2, . . . , 1 synchronous or asynchronous frequency-hopping sources with independent pseudo-random frequency hopping sequences $w_i=[w_i(1) w_i(2) \ldots w_i(N)]$, where $w_i(n)$ is the hop frequency of source i during the nth hop dwell (or equivalently the nth pulse; the start time of this pulse is denoted $t_i^n$). The ultimate goal is to associate the received channel-impaired hopped signals, $x_i(t_i^n)$; centered at hop frequency $w_i(n)$ during the nth dwell, with their respective source signals $s_i(t_i^n)$ by taking advantage of polarization-frequency characterizations, and related characterizations when additional antennas are also employed. The transmitted signal from source i during frequency hop dwell n=1, 2, . . . , N may be represented as $$s_i(t_i^n) = \alpha_i(t_i^n) e^{jw_i(n)t_i^n}. \quad (1)$$

Signal $s_i$ propagates through a multipath channel with channel impulse response $h_i$, leading to the corresponding frequency selective response, $x_i$ incident at the sensor, where $$x_i(t) = \begin{bmatrix} x_i^{p_1}(t) \\ x_i^{p_2}(t) \end{bmatrix} = \begin{bmatrix} h_i^{p_1} \\ h_i^{p_2} \end{bmatrix} * s_i(t). \quad (2)$$

Here the superscripts $[p_1; p_2]$ represent orthogonally-polarized receiver elements, and $h_i^z$, $z \in [p_1, p_2]$ is the channel impulse response associated with the propagation channel from the ith source to the sensor's zth polarization port, i.e., $$h_i^z = \sum_{l=1}^{L} \alpha_{i,l}^z \delta(t_i^n - \tau_{i,l}), z \in \{p_1, p_2\}, \quad (3)$$

where an L-tap filter with delays $\tau_{i,l}$, l=1, . . . , L is assumed.

The received signal vector at dwell n is the superposition of the corresponding source signals, which are assumed to be synchronous and non-overlapping in frequency at any instant. The assumption that the signals are synchronous is not essential to the approach, but is assumed for ease of exposition. When overlapping conditions do occur, the collision is detected and not considered further. The combined received signal may be represented in the time domain as $$y(t_i^n) = \begin{bmatrix} y^{p_1}(t_i^n) \\ y^{p_2}(t_i^n) \end{bmatrix} = \sum_{i=1}^{I} x_i(t_i^n) + n(t_i^n), \quad (4)$$

where n is complex zero-mean additive white Gaussian noise.

In the frequency domain, after taking a Discrete Fourier Transform, the aggregate response may be represented as $$Y[k] = \begin{bmatrix} Y^{p_1}[k] \\ Y^{p_2}[k] \end{bmatrix} = \sum_{i=1}^{I} H_i[k] S_i[k] + N[k], \quad (5)$$

where $H_i=[H_i^{p_1} H_i^{p_2}]^T$ is the frequency-dependent channel gain vector associated with the ith source, $S_i$ is the frequency domain representation of the signal from the ith source, k is the subband index, and the noise vector, N, is a column vector with elements corresponding to white Gaussian complex noise. In the case when the signals have identical pulse widths, hop frequencies, hop sets, bandwidths, modulation schemes, and are synchronous (but frequency non-overlapping) at the receiver, the conventional time-domain features of the signals, such as time of arrival (TOA), pulse width, pulse repetition interval (PRI), etc, are not useful in classification. In addition, due to the frequency selectivity of the signal responses, amplitude-based mixing methods, which typically rely on identical mixing across all frequencies, are not appropriate. DOA methods are generally not relied upon in this technique, since their complexity tends to increase significantly in the presence of multipath. Instead, the passive receiver employs a dual-polarized antenna to estimate the polarization mode dispersion properties associated with each source. The resulting characterization may be used to effectively associate pulses.

Signal processing algorithms discussed in this section include pulse detection and Stokes-frequency characterization. These characterizations are utilized for signal association using a dynamic signal feature library discussed in Section IV.

A. Pulse Detection

Figure 2:
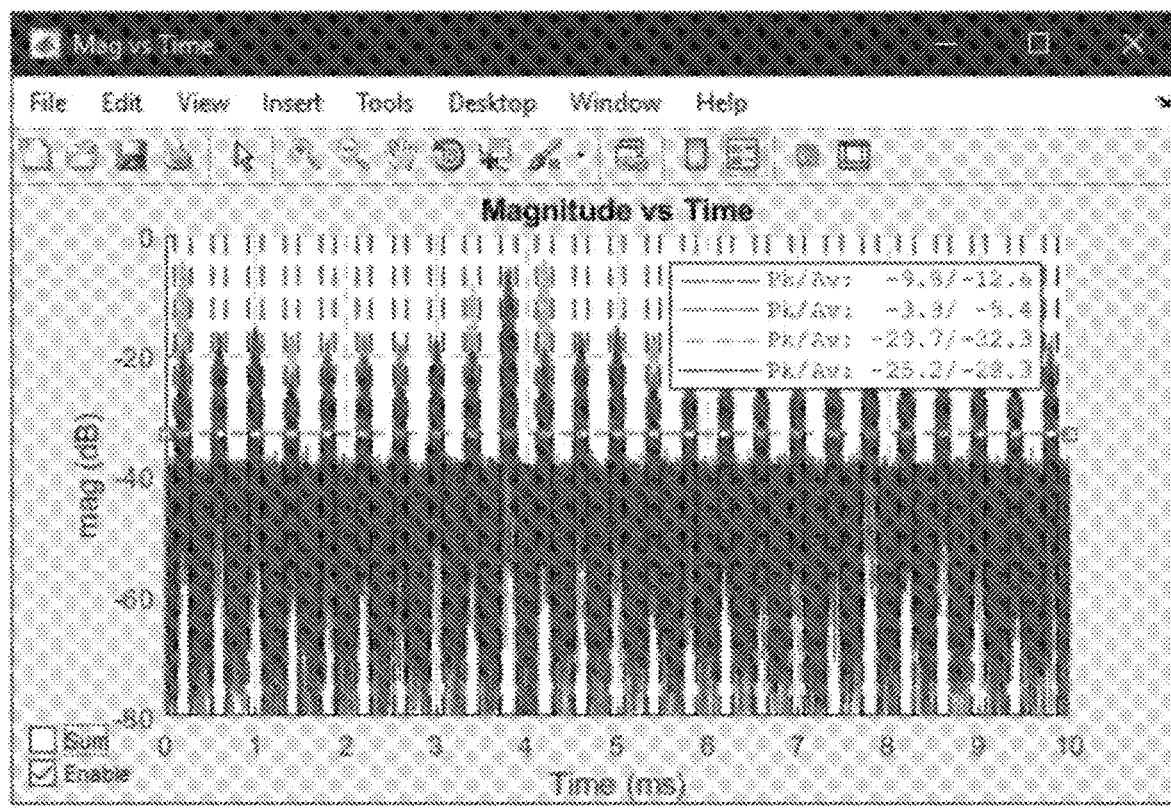
FIG. 2 shows time-domain signals that are time-separable.
Figure 2:
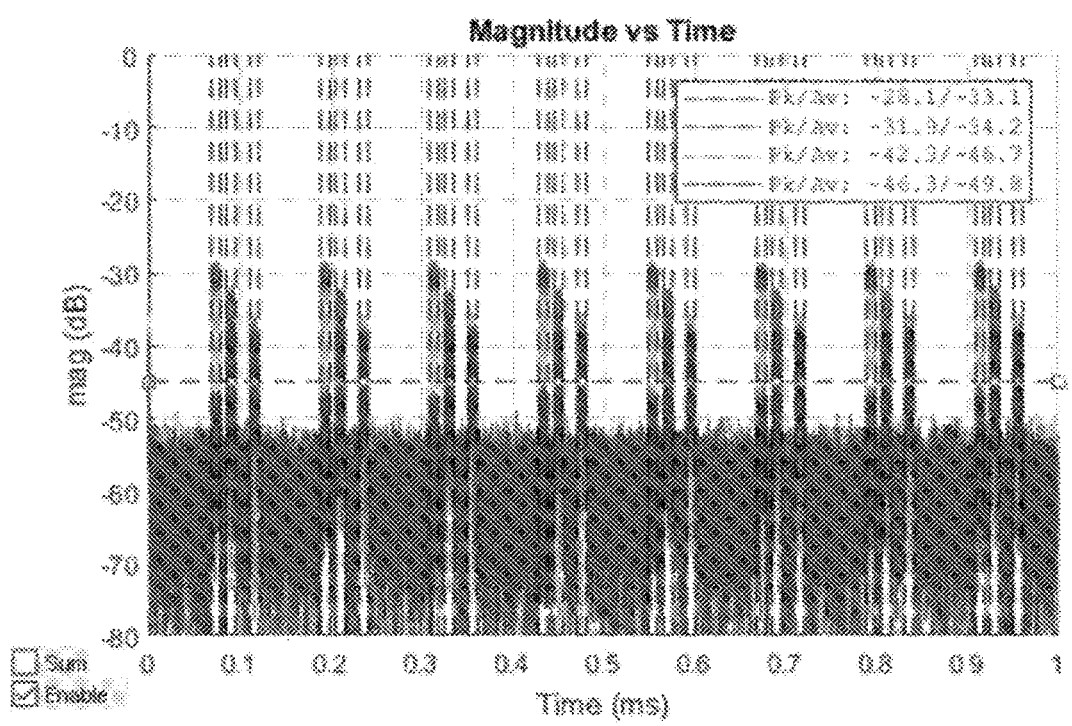
Figure 3:
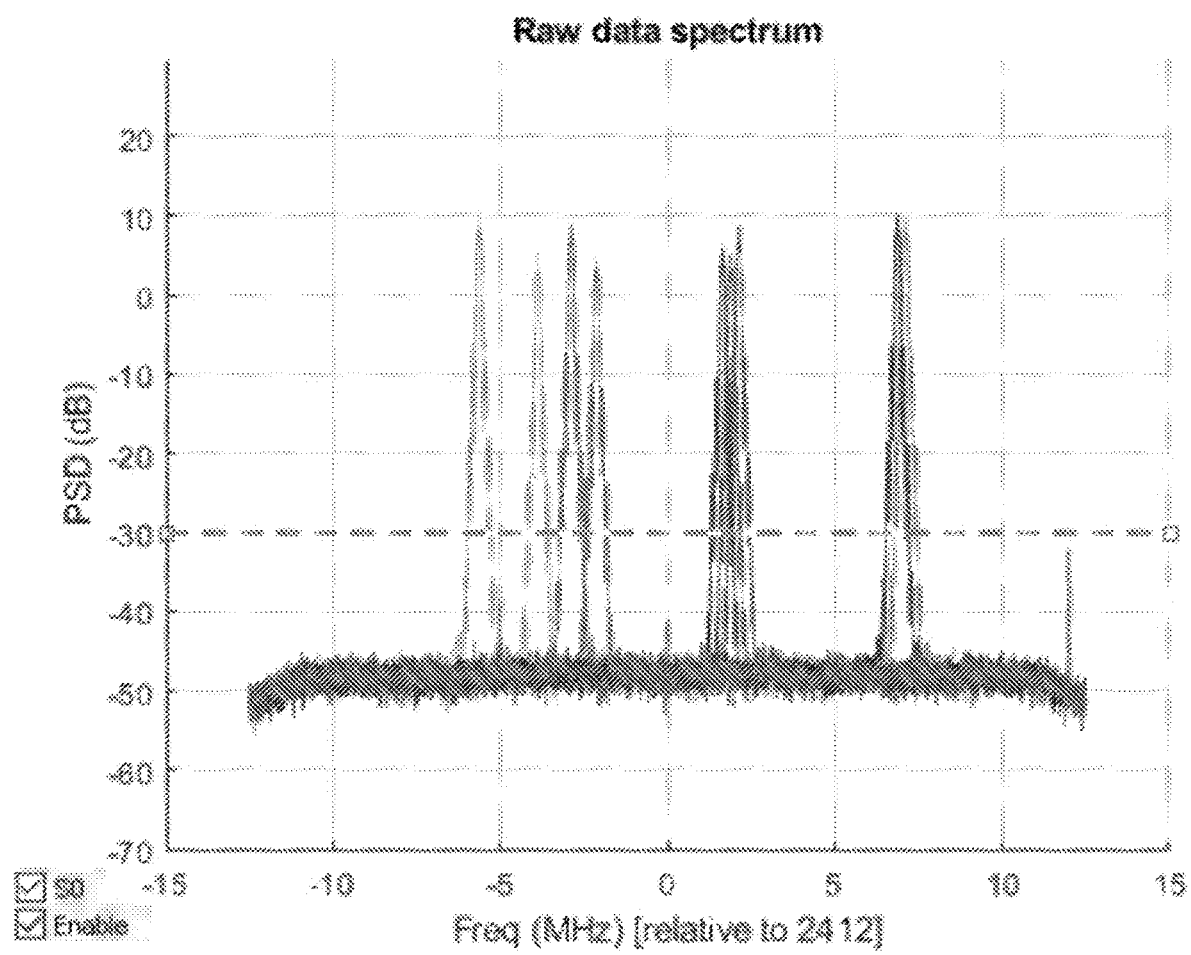
FIG. 3 shows frequency-domain signal of frequency-hopping sources.

Consider now the sampled vector streams at the receiver. In the time domain, intervals are flagged for consideration when the total signal power (e.g., the square of the vector norm) exceeds a power level that is set by the user. This process is demonstrated in FIG. 2, which shows time-domain signals (multi-tone signals in the top graph; frequency-hopping signals in the bottom graph) that are time-separable (e.g., as discussed in U.S. Patent Publication 2017/0019193, which is incorporated by reference herein in its entirety), where the start and end times of the detected pulses are estimated. These signal interval start and end times are passed into a first processing function, where a fast Fourier transform (FFT) is performed on the samples within that interval, yielding a short-time Fourier Transform. An example of resulting FFTs of several pulses is shown in FIG. 3, which shows a frequency-domain signal of some frequency-hopping sources.

Assuming a Z-point FFT, the outputs of the FFT results are grouped into I equally spaced subbands, where $1 \leq Z$. The output indices from the FFT that correspond to the ith subband are:

$$Z_i = \left\{ \left\lceil \frac{(i-1)Z+1}{I} \right\rceil, \ldots, \left\lfloor \frac{iZ}{I} \right\rfloor \right\}, \quad (6)$$

where $\lceil \cdot \rceil$ and $\lfloor \cdot \rfloor$ correspond to rounding up and rounding down to the nearest integer, respectively.

For each subband, the signal is filtered to that subband with a finite impulse response (FIR) filter that is the bandwidth of that subband.

1) Collision Detection: Collision detection is performed using time sequences from each subband. Defining $T_{p,i}$ as a row vector representing the time-domain signal at the pth receiver port and the ith subband allows for definition of the P-row signal matrix:

$$T_i = \begin{bmatrix} T_{1,i} \\ \vdots \\ T_{P,i} \end{bmatrix}, \quad (7)$$

The corresponding covariance matrix is given by $$V_i = T_i T_i'. \quad (8)$$

The covariance matrix associated with subband $i \in \{1, \ldots, 1\}$ can help provide an indication of signal collisions that occur in the subband over the time interval used for data support. The eigenvalues of $V_i$ should result in q values that are significantly greater than the noise floor, where q is the number of signals occupying that subband, and P-q values that are approximately noise. If q≥2, then multiple signals in that subband are presumed (i.e., a collision exists) and no processing is undertaken; if q=1, a single source signal is presumed, and signal processing to characterize the detection begins. The work detailed here only processes signal detections that do not exhibit evidence of a collision; collision resolution is irrelevant to demonstration of the approach.

B. Stokes-Frequency Characterization

When a signal is detected, Stokes parameters are calculated for the two receivers $p_1$ and $p_2$ at the kth subband as $$P_{p_1,p_2} = \begin{bmatrix} S_0^{p_1,p_2}[k] \\ S_1^{p_1,p_2}[k] \\ S_2^{p_1,p_2}[k] \\ S_3^{p_1,p_2}[k] \end{bmatrix} = \begin{bmatrix} |Y^{p_1}[k]|^2 + |Y^{p_2}[k]|^2 \\ |Y^{p_1}[k]|^2 + |Y^{p_2}[k]|^2 \\ 2\text{Re}(Y^{p_1}[k](Y^{p_2}[k])^*) \\ -2\text{Im}(Y^{p_1}[k](Y^{p_2}[k])^*) \end{bmatrix} \quad (9)$$

$\hat{p}_{p_1,p_2}[k]$ is then normalized to the unit sphere to yield $$P^{p_1,p_2}[k] = \frac{\left|S_1^{p_1,p_2}[k] S_2^{p_1,p_2}[k] S_3^{p_1,p_2}[k]\right|^T}{S_1^{p_1,p_2}[k]^2 + S_2^{p_1,p_2}[k]^2 + S_3^{p_1,p_2}[k]^2}. \quad (10)$$

The resulting normalized Stokes-frequency vectors, which, when taken for a single source over that source's bandwidth, comprises that source's polarization-mode dispersion (PMD) curve, are the signal features leveraged in processing. FIG. 4 plots example results of these vectors on the Poincare sphere. As shown in the top sphere, enabling the "persistence" feature forces the plot to retain signal points from previous time blocks. As shown in the bottom sphere, all PMD/CSD manifolds can be plotted on the same Poincare sphere. This is discussed further in U.S. Patent Publication 2017/0019193, which is incorporated by reference herein in its entirety.

Importantly, this can be applied to any number of receiver elements, with each pairing of elements creating a new manifold (e.g., each pair results in a CSD curve). Representing a single signal on multiple manifolds adds degrees of freedom to measurements of that signal.

IV. Signal Association

A. Libraries

Two libraries are maintained by the receiver or a processor communicatively coupled to the receiver: a tracked response library (TRL) and a temporary library (TML) containing responses associated with the current measurement window. When processing begins, the TRL is empty. Upon signal detection, a TML is formed and is comprised of all estimated PMD/CSD curves (or portions of PMD/CSD curves) that have been detected in the current time window. Responses within the resulting TML are matched with existing curves in the TRL or appended to the TRL if there are no matches to the response. The curves in the TRL are also checked to re-evaluate matches and detect mismatches. To minimize or reduce the possibility of outliers, the number of detections for each curve in the TRL are tracked; once a curve has been detected at least a set number of times (e.g., five times), it is acknowledged as a known source.

B. Correlation Between Two Curves

To determine the quality of the match between two curves, one of two methods is employed, depending on whether the two curves are adjacent in frequency or overlap in frequency. Both methods partition the curves being compared into subband components. To compare non-overlapping curves at neighboring subbands, the arcdistance correlation measure between the two curves $f$ and $g$ at neighboring subbands $k_f$ and $k_g$ (with loci $P^f[k_f]$ and $P^g[k_g]$ respectively) is computed:

$$\hat{d}^{f,g}[k_f, k_g] = P^f[k_f] \cdot P^g[k_g]. \quad (11)$$

This correlation measure is usually used with $k_f = k_g \pm 1$. Due to the frequency-dependence of the polarization response, any comparison of loci is most susceptible to the difference in position of the true means of the loci. To compare overlapping responses, the normalized probability distribution function (PDF) of a cluster with known/presumed mean $(P_s)$ and SNR $(k_s)$ is used to compute the distribution value at a measured point $(P)$ [13]:

$$f(P | P_s, k_s) = \frac{1}{4\pi}(1 + k_s + k_s(P \cdot P_s)) \times \exp(-k_s(1 - P \cdot P_s)). \quad (12)$$

This approach can be extended to consider the complementary cumulative distribution function (CCDF) as a function of the arcdistance between P and $P_s$, $\cos \theta_{P,P_s} = P \cdot P_s$:

$$F(\theta_{P,P_s} | k_s) = \frac{\cos \theta_{P,P_s} + 1}{2} \exp(k_s(1 - \cos \theta_{P,P_s})). \quad (13)$$

Using the CCDF with two curves at the same subband k located at $P^f[k]$ and $P^g[k]$ with respective SNRs $k_s^f$ and $k_s^g$, the correlation measure can be defined as the average value of the CCDFs:

$$\hat{d}^{f,g}[k] = \frac{F(\arccos(P^f[k] \cdot P^g[k]) | k_s^f)}{2} + \frac{F(\arccos(P^f[k] \cdot P^g[k]) | k_s^g)}{2}. \quad (14)$$

The measure $d^{f,g}[k]$ is computed in a manner that depends on the conditions of the two curves to be compared, as follows:

$$d^{f,g}[k] = \begin{cases} \hat{d}^{f,g}[k], & P^f[k] \text{ and } P^g[k] \text{ exist,} \\ \hat{d}^{f,g}[k_f, k_g], & \begin{cases} P^f[k_f] \text{ and } P^g[k_g] \text{ exist,} \\ P^f[k] \text{ or } P^g[k] \text{ do not} \\ \text{simultaneously exist for any } k, \\ k_f = k \text{ or } k_g = k, \\ \text{and } k_f = k_g \pm 1, \end{cases} \\ \nexists & \text{else.} \end{cases} \quad (15)$$

The correlation measure between curves x and y across all k is the mean of all $d^{f,g}[k]$ for which $d^{f,g}[k]$ exists:

$$D^{f,g} = \frac{\sum_{i:\exists d^{f,g}[k]} d^{f,g}[k]}{\sum_{i:\exists d^{f,g}[k]} 1}. \quad (16)$$

Figure 5:
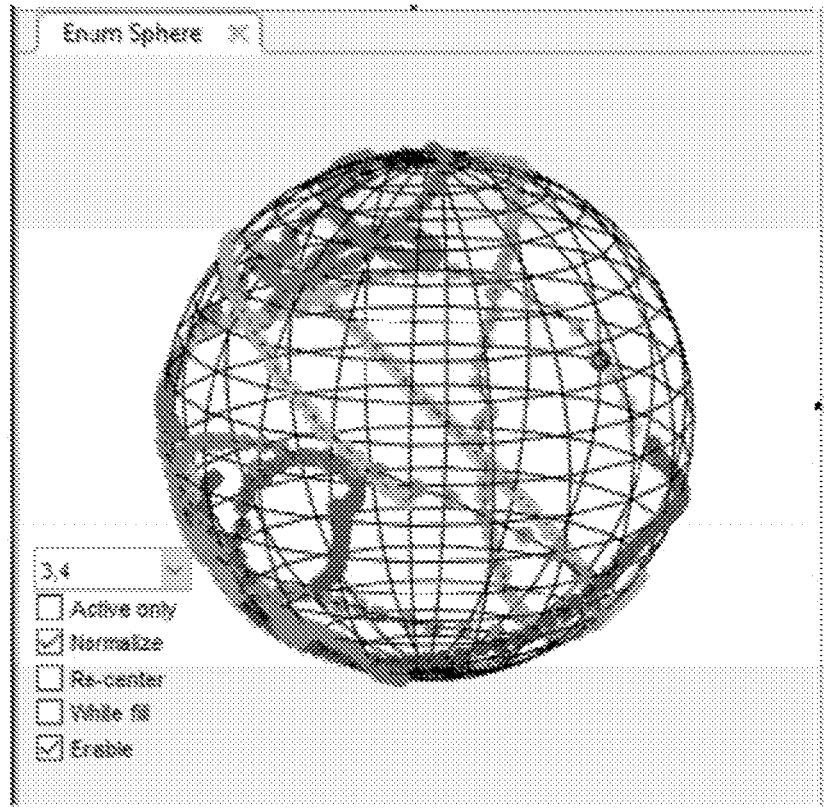
FIG. 5 shows results of matching signals based on correlation. Ten curves result.

This value must exceed some threshold for the two curves to be declared as coming from the same source, but this threshold is different depending on how $d^{f,g}[k]$ is defined; this value of $D_t$ is mostly found through observation but is different depending on whether $D^{f,g}$ is defined by $\hat{d}_i^{f,g}$ or $\tilde{d}_i^{f,g}$. From observation for the example set, If $D_t$ is calculated from $\hat{d}^{f,g}[k_f, k_g]$, a suitable range for $D_t$ may be $0.45 < \hat{D}_t < 0.95$, while if $D_t$ is calculated from $\tilde{d}^{f,g}[k]$ then a suitable range for $D_t$ may be $0.0002 < \tilde{D}_t < 0.8$, though other ranges can also be used. Results of matching are illustrated in FIG. 5, which shows ten curves which were the result of matching signals based on correlation. The activity of these sources can be tracked as a function of time as shown in FIG. 6. The system can track which sources are on at any given time. If a source has any signals assigned to it in the given time window, it is declared as "on".

C. Matching Within the Set

After curves are detected, the program then attempts to find replicates of the same curve. The process compares all detected curves against one another. Consider two curves that overlap over some number of subbands, but not necessarily all of them; for curve $\alpha$, it occupies the frequency range $\beta_i \in f\alpha = \{f_\alpha^\nabla, \ldots f_\alpha^\Delta\}$, and curve b occupies the frequency range $f_i \in f_b = \{f_b^\nabla, \ldots f_b^\Delta\}$, with $f^\nabla$ denoting the lowest frequency occupied subband and $f^\Delta$ denoting the highest frequency occupied subband. If $f_{\alpha \cap b} = f_\alpha \cap f_b$ is not empty, the two curves overlap. For frequency $f_i \in f_{\alpha \cap b}$, the two curves have a position on each manifold; for the jth of J manifolds, curve $\alpha$ has position $P_{i,j}^\alpha$ and curve b has position $P_{i,j}^b$. An average dot product is calculated over all manifolds and all frequencies in $f_{\alpha \cap b}$:

$$d_{i,j}^{a,b} = P_{i,j}^a \cdot P_{i,j}^b, \quad (17)$$

$$D^{a,b} = \frac{1}{J \cdot \#\{f_{a \cap b}\}} \left( \sum_{j=1}^{J} \sum_{i:f_i \in f_{a \cap b}} d_{i,j} \right), \quad (18)$$

where $\#\{x\}$ is the number of elements in x.

This value of $D^{\alpha,b}$ is then compared against a correlation threshold D t (e.g., $D_t = 0.99$); if $D^{\alpha,b} > D_t$, the two curves are declared to describe the same source and are merged, while if $D^{\alpha,b} < D_t$, the two curves are declared to describe different sources and no action is taken. If the two curves are declared as overlapping, they are grouped into a set that will be averaged after all curve pairings (all values of $D^{\alpha,b}$) are found. The process does not require that a new curve matches with all curves in an existing set; it only has to match with one curve to be added to the same set as that curve. Suppose that this process produces a set of curves that describe the same source. Every curve within this set matches with at least one other curve in the set, but not all curves necessarily match with all other curves in the set. For a given set $C_p$, the curve that describes the set is taken to be the average position of the curves in the set at each frequency and on each manifold:

$$C_p^{i,j} = \frac{\sum_{c:f_i \in f_a} P_{i,j}^c}{\left\| \sum_{c:f_i \in f_a} P_{i,j}^c \right\|}, \quad (19)$$

where $\|x\| = \sqrt{x \cdot x}$. The result of this process is a number of curves described by unit vectors across some number of contiguous subbands and across all manifolds.

1) Adjacent but not Overlapping Curves: Suppose that two curves do not overlap in frequency, but the end of one curve is adjacent to the end of the other curve, $f_\alpha^{\Delta+1} = f_b^\nabla$, as is commonly the case with frequency-hopping signals. In that case, matches can be attempted across this gap:

$$d_j^{\alpha,b} = P_{f_\alpha^{\Delta+1}}^\alpha \cdot P_{f_b}^{\nabla b}. \quad (20)$$

Due to the frequency-dependent polarization, these points are expected to have a larger separation, so the value of $D_t$ is lower for matching using this method.

2) Curves with an Empty Subband Between Them: This case most commonly accounts for a single subband that does not appear to be occupied by a single source, due to factors such as an unavoidable external tone in that subband that causes all signals in that subband to be classified as collisions. In this case, $P_{i_\alpha}^\alpha$ and $P_{i_b}^b$ exist for some $i_\alpha = i_b \pm 2$ but not for any $i_\alpha = i_b \pm 1$ or $i_\alpha = i_b$. The two curves are extrapolated to $(i_\alpha + i_b)/2$ and matching is done in this single subband with the extrapolated values; since SNR is not also extrapolated, only the arcdistance correlation, $\hat{d}_i^{\alpha,b}$, can be used. These extrapolated points are denoted $\hat{P}$ and are used in arcdistance correlation calculation:

$$\hat{d}_i^{\alpha,b} = \hat{P}_{i_\alpha}^\alpha \cdot \overline{P}_{i_b}^b \text{ for } i_\alpha = i \pm 1 \cdot i_b = i \pm 1. \quad (21)$$

This matching is compared to the arcdistance threshold of $\hat{D}_t$. Attempting to bridge gaps larger than one subband requires more extreme extrapolations; depending on the extrapolation technique used, this extrapolation can diverge in as few as two subbands outside the frequency range of the curve. As such, no attempts are made to match curves that have two or more empty subbands between them.

D. Checking for Better Curve Connections

During each pass through the method, the adjacent-subband correlation is calculated for each curve:

$$D_k^{f,f} = P^f[k] \cdot P^f[k+1], \quad (22)$$

as well as the adjacent-subband correlation from one curve to another:

$$D_k^{f,g} = P^f[k] \cdot P^g[k+1]. \quad (23)$$

The system checks if $D_k^{f,g} > \alpha D_k^{f,g}$, where $\alpha$ is some small confidence factor slightly greater than 1; $D_k^{f,g}$ must be significantly better than $D_k^{f,f}$ before the switch is made. If a better match is found, the program has decided that the section of curve $f$ at subband k matches better with curve g at subband k+1 than with curve $f$ at subband k+1. When this match is made, the segments of the curves not included in this matching (curve $f$ starting at subband k+1 and curve g ending at subband k) are separated as separate curves and the better-matched curves are spliced together; three new curves result:

$$C_{new}^1 = C_f(k+1, \ldots, k_f^\Delta), \quad (24)$$

$$C_{new}^2 = C_g(k_g^\nabla, \ldots, k), \quad (25)$$

$$C_{new}^3 = (C_f(k_f^\nabla, \ldots, k), C_g(k+1, \ldots, k_g^\Delta)), \quad (26)$$

where $k_f^\Delta$ and $k_f^\nabla$ denote the highest and lowest subbands occupied by curve $f$, respectively.

E. Pairing New Points to Existing Curves

The set of curves from the latest time block must now be added to the existing library. For the $f$th curve from the TML and the gth curve from the TRL, the correlation is:

$$d^{f,g}[k] = P^f[k] \cdot P^g(k), \qquad (27)$$

$$D^{f,g} = \frac{1}{J \cdot \#\{k \in k_{f \cap g}\}} \left( \sum_{k \in k_{f \cap g}} d^{f,g}[k] \right), \qquad (28)$$

where $\#\{\cdot\}$ is the number of elements in the set and $k_{f \cap g}$ is the set of all frequencies where curves for both $f$ and $g$ exist. In contrast to Section IV-C, this step assumes that no two curves in the TML describe the same source and that no two curves in the TRL describe the same source. The system creates the F×G matrix composed of the values of $D^{f,g}$, where F is the number of curves in the TML and G is the number of curves in the TRL. If no value exists for $D^{f,g}$ (if the two curves do not overlap in frequency, for example) $D^{f,g} = 0$. With this new matrix D and the assumption that each curve from the TML can match with up to one curve from the TRL, the assignment problem can be solved using—D as the cost matrix. The assignment problem selects up to one element from each row and up to one element from each column to minimize the total cost of the selected elements. The assignment problem takes the form $$R^k = \sum_{g \in \{1, \ldots, G\}} \sum_{f \in \{1, \ldots, F\}} D^{f,g} c_{f,g}, \qquad (29)$$

$$\sum_{g \in \{1, \ldots, G\}} c_{f,g} = 1 \text{ for all } f \in \{1, \ldots, F\}, \qquad (30)$$

$$\sum_{f \in \{1, \ldots, F\}} c_{f,g} = 1 \text{ for all } g \in \{1, \ldots, G\}, \qquad (31)$$

$$c_{f,g} \in \{0, 1\} \text{ for all } f, g \in \{1, \ldots, F\}, \{1, \ldots, G\}. \qquad (32)$$

If F≠G, there will be F-G rows of the matrix c (containing the elements $c_{f,g}$) with all zeros if F>G, or G-F columns of c with all zeros if G>F. The resulting matrix c indicates the best pairings of curves from the existing library and from the new set, but it must still be referred back to D for whether or not the pairing is good enough; a pairing of a curve from the existing library and a curve from the new set is finalized only if $c_{f,g} = 1$ and $D^{f,g} > D_t$. When a pairing is made, the curve from the TML supersedes the curve from the TRL; the new curve, $C_{new}$, is defined by the new curve where it exists and by the old curve where it exists but the new curve doesn't:

$$C_{new} = \begin{cases} C_f, & k \in k_f, \\ C_g, & k \in k_g \text{ and } k \notin k_f, \end{cases} \qquad (33)$$

where $k_f$ is the frequency range over which curve $f$ exists. The curves formed in this way replace the existing curve in the TRL. Curves from the TML that are not matched with any curve from the TRL are simply appended to the TRL. Curves that already exist in the TRL but are not matched with a new curve are left untouched.

F. Pairing Curves Within The TRL

Consider the case of two curves that, when they were initially detected, were not close enough to be declared the same source before but there now exists enough evidence to match the two curves. This matching of curves within the TRL occurs at this stage. It functions like the process in Section IV-C, except it considers curves already defined in the TRL. Enumeration counts the number of curves that have been detected a specified number of times (e.g., 5 or more times).

V. Confusion Matrix

The source responses in the TRL may be used to compute a confusion matrix to characterize the potential of confusing source responses. Illustrative results will be shown in the next section. The confusion matrix generated by the demo is a simulation using the known sources stored in the TRL and assuming the generated curves belong to one of these source curves. Each curve has a PMD response and an SNR in each subband. For a single subband, the probability distribution function (PDF) of points generated by that source follow $$f(P | \mu, k) = \frac{1}{4\pi}(1 + k + k(P \cdot \mu))\exp(-k + k(P \cdot \mu)), \qquad (34)$$

or, as the Rayleigh-like distribution as a function of arcdistance between P and μ, $$f(\theta | k) = \frac{\sin \theta}{4\pi}(1 + k + k \cos \theta)\exp(-k + k \cos \theta), \qquad (35)$$

with complementary cumulative distribution function (CCDF)

$$F(\theta | k) = \frac{1 + \cos \theta}{2} \exp(-k + k \cos \theta). \qquad (36)$$

Figure 7:
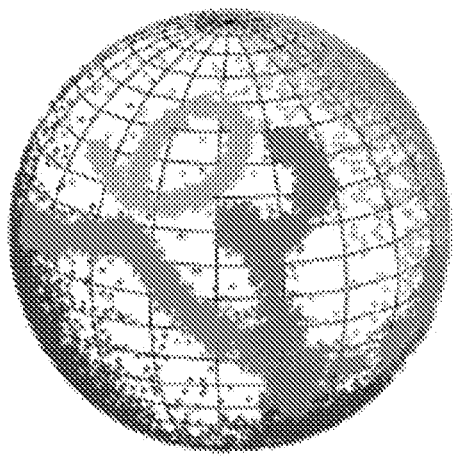
FIG. 7 shows samples of PMD curves at varying levels of noise. The definition of the curves deteriorate as SNR decreases.
Figure 7:
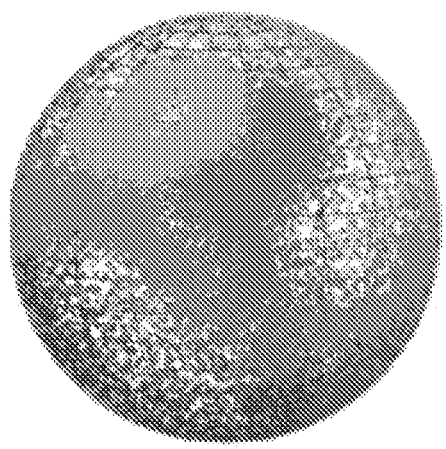
Figure 7:
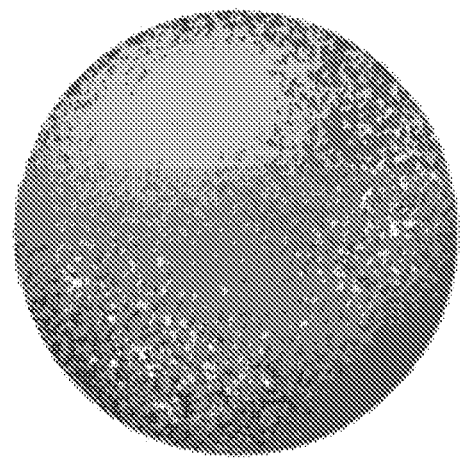

To simulate a new signal from a given curve, a random variable X~Unif[0,1] is generated and the value of θ is found from X=F(θ|k). A direction from the curve is chosen using a random variable Y~Unif[0,2π], and the point that is θ away from ρ in that direction is taken to be the simulated point. This process is repeated for every subband. Once a new curve has been simulated from one of the sources, it is matched to one of the sources using Bayes decision. Reducing the SNR of the system causes the received PMD curves to lose definition, as in FIG. 7, which shows samples of PMD curves at varying levels of noise. The definition of the curves deteriorates as SNR decreases. The top left sphere in FIG. 7 shows original SNR; the top right sphere shows 10 dB below original SNR; the bottom sphere shows 20 dB below original SNR. FIG. 7:

VI. Over-the-Air (Ota) Laboratory-Based Demonstration

In previous approaches (e.g., U.S. Patent Publication 2017/0019193), processing for FH signals consisted of an unsupervised training phase, where several seconds of data were collected and processed into tens or hundreds of feature vector measurements per subband per source. With the collected feature vectors, the system attempted to estimate the number of clusters in each subband, then formed that many clusters in each subband. Once clusters were found within each subband, clusters in adjacent subbands were paired according to their proximity. Using this method, polarization mode dispersion response curves were formed by connecting clusters across all relevant subbands. Once curves were formed, future collected data could be compared with the curves at the frequency of each pulse to determine associations for those points.

For the FH signals, the duration of the observation interval was set so that the frequency hopping systems will hop over all frequencies to enable dispersion response characterizations. Moreover, the signal features must remain approximately fixed over the duration of the observation interval to facilitate accurate cluster enumeration and source characterizations.

A. Ten Sources: Frequency Hopping

Figure 8:
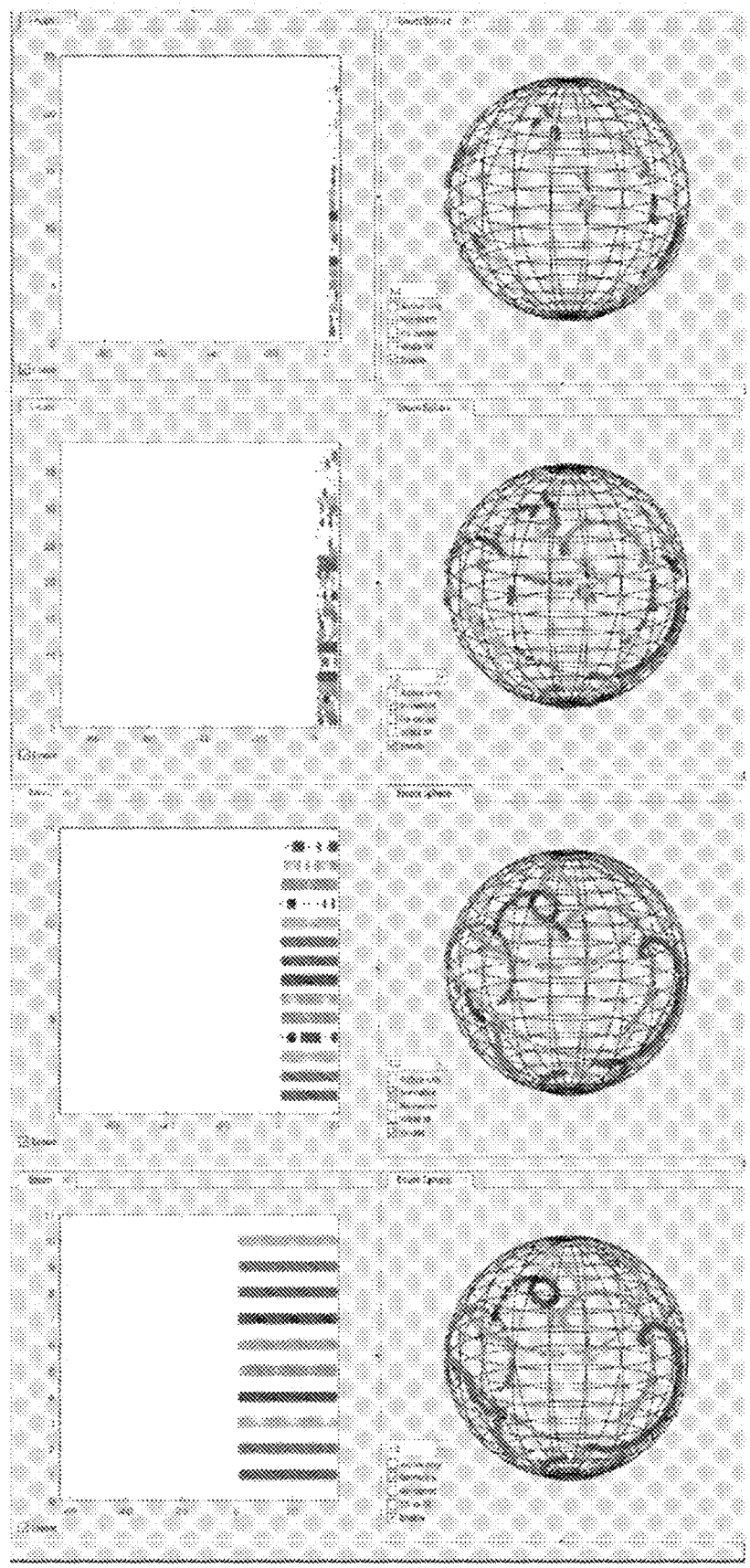
FIG. 8 shows a process of building PMD curves over time.

To illustrate the efficacy of the approach, a set of 10 frequency-hopping sources were utilized in an experiment with software-defined radios (SDRs) in a laboratory space, roughly 15 feet by 20 feet. The frequency hopping sources used the same pulse width (500 μs), pulse repetition interval (10 ms), and a 1 Mbps binary phase shift keying (BPSK) data modulation riding the carrier frequency, which was hopped to one of 80 hop frequencies in an 80 MHz band. When data collection starts, a dual-polarized receiver initially detects narrow-band signals that are saved separately in the library when they do not overlap in frequency. During this initial period, the system logs dozens of "curves" in its TML. FIG. 8 shows the process of building PMD curves over time. Top graph: Early stages of the demonstration with 10 frequency-hopping sources. The TRL is gaining PMD curves that occupy small frequency ranges. Connecting across subbands has not begun since there is not enough data to do so. Second graph: As more pulses are detected, new pulses are added to existing curves, allowing some curves to cover a wider frequency range. More standalone points are declared than existing curves are merged, so the number of declared sources continues to rise. Third graph: More detections and continuous merging of curves leads to a shortage in frequencies where pulses cannot be paired with existing curves. Curves are now being merged faster than new standalone segments can be declared. Bottom graph: After processing about 1.5 seconds of data, the system has learned the full PMD curves for each source and declares the correct number of sources.

Figure 9:
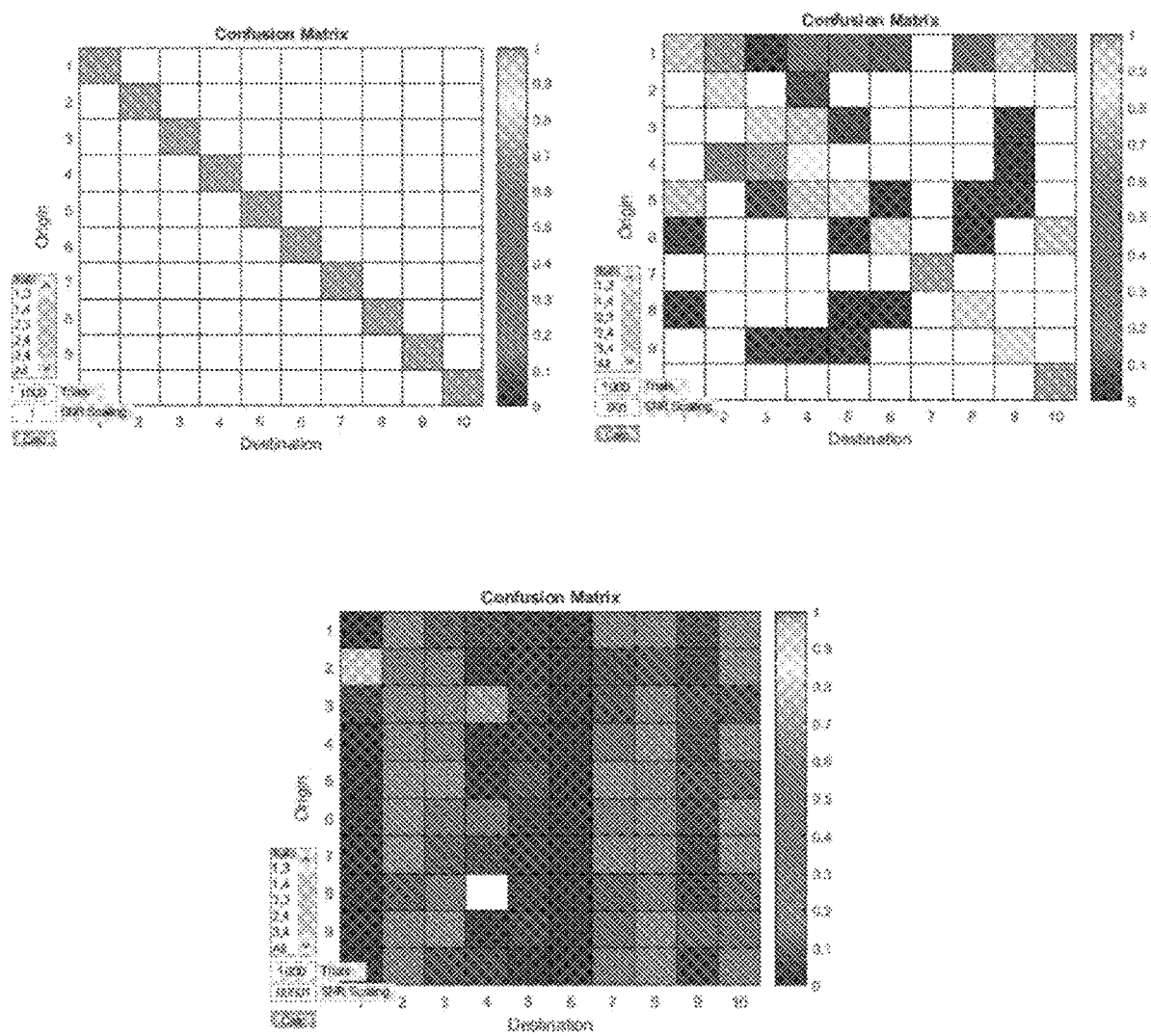
FIG. 9 shows confusion matrix performance of frequency-hopping data at different SNR levels.

The top graph in FIG. 8 shows the early stages of data collection, when clusters start to be displayed by the system. As more points arrive, new points start to partially overlap in frequency with pulses already defined in the TML. Assuming the two detections are close enough in polarization and frequency, the two are merged. This merging commonly happens when a signal that occupies a narrow frequency range overlaps at its lowest frequency with the high-frequency region of another curve while also overlapping at its highest frequency with the low-frequency region of a third curve. However, more standalone subbands are declared than existing curves are paired with other existing curves, and the total number of declared sources continues to rise. This is seen in the second graph in FIG. 8. As processing progresses, enough information is known about the PMD curves that new pulses will overlap an existing curve with increasing likelihood. At this point, the number of declared sources begins to decrease. Eventually, every subband is occupied enough times by every source that the full PMD curves can be found. At this point, after processing about 1.5 seconds of data, the number of declared sources settles at the target 10, as seen in the bottom graph in FIG. 8. Once the system has settled, the confusion matrix is found at decreasing SNR values; results are shown in FIG. 9, which shows confusion matrix performance of frequency-hopping data at different SNR levels. (Top left: at measured SNR; top right: 30 dB below measured SNR; bottom: 40 dB below measured SNR.)

B. Ten Sources: Non-Frequency Hopping

In this collection, 10 multi-tone sources were used. Since the sources always occupied the same frequency range, they could not overlap in time without colliding, so they transmitted with the same pulse repetition intervals but different start times so they never overlapped in time.

Figure 10:
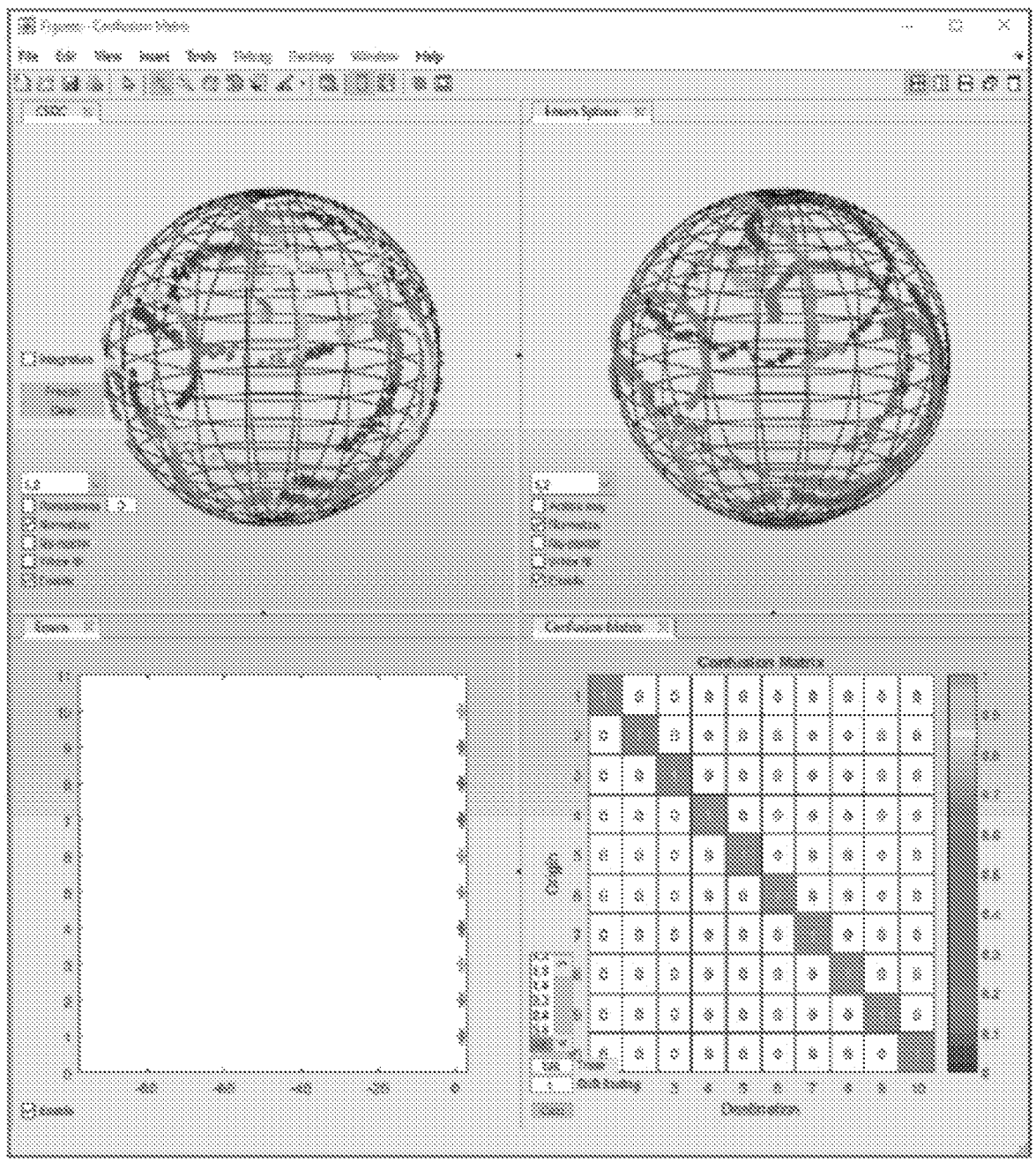
FIG. 10 shows a demonstration with 10 multi-tone sources. Processing uses two time windows totaling 20 milliseconds of data to identify all 10 sources.
Figure 11:
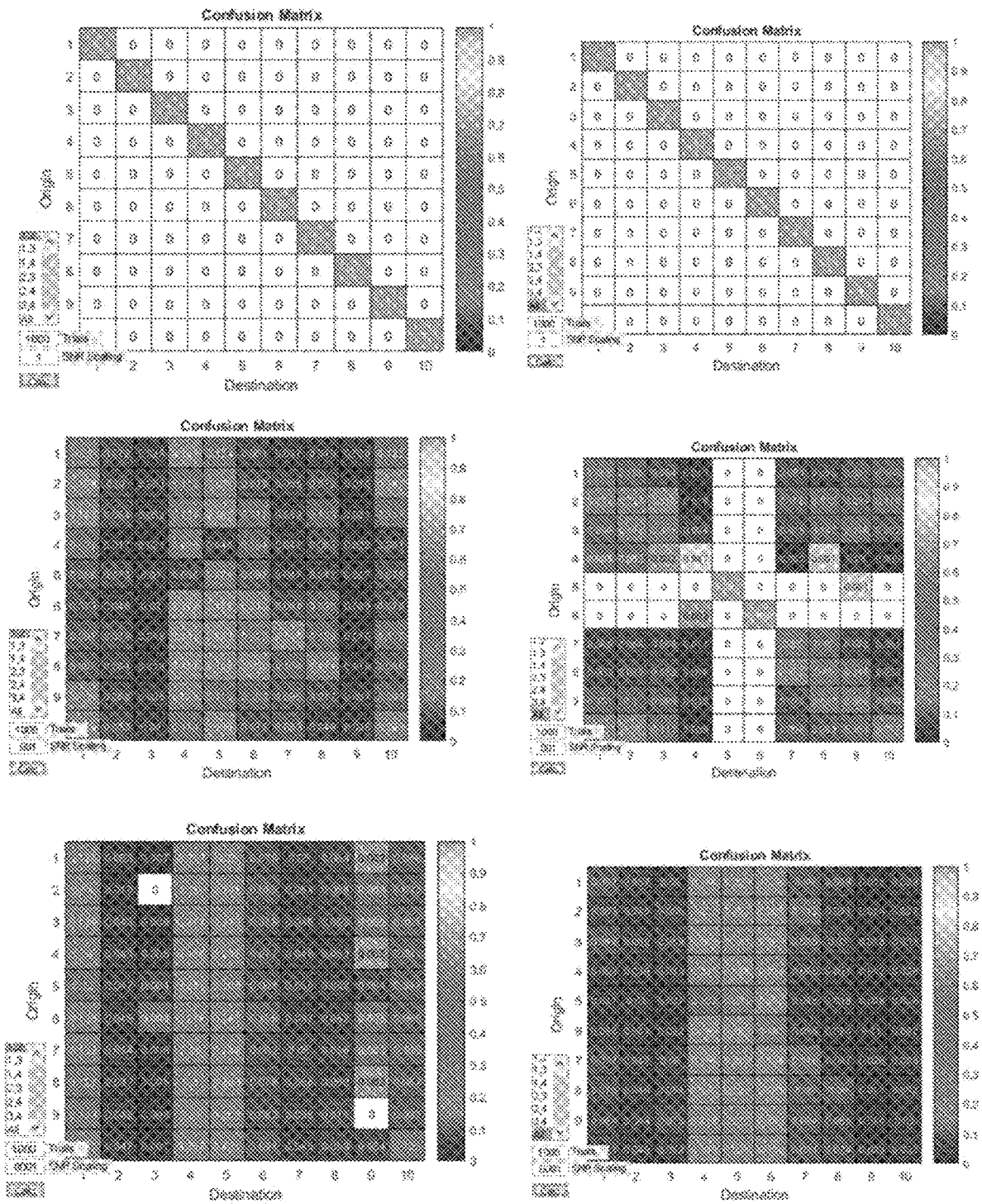
FIG. 11 shows confusion matrix performance of multitone data for one manifold vs. six manifolds at different SNR levels.

The processing breaks up the curves into multiple curve segments with one subband each; this is done to eliminate the corner case of two sources occupying adjacent subbands without overlapping in frequency. The processing immediately re-merges these curve segments due to their proximity to the curve segments in adjacent subbands. With each PMD curve fully identified over the course of a single pulse, the curves are identified in a few pulses per source. FIG. 10 is a demonstration with 10 multi-tone sources. Processing uses two time windows totaling 20 milliseconds of data to identify all 10 sources. FIG. 10 shows the output after 20 milliseconds of data. The performance as a function of SNR and number of manifolds is given in FIG. 11, which shows confusion matrix performance of multi-tone data for one manifold vs. six manifolds at different SNR levels. (Top left: One manifold at measured SNR. Top right: Six manifolds at measured SNR. Middle left: One manifold 30 dB below measured SNR. Middle right: Six manifolds 30 dB below measured SNR. Bottom left: One manifold 40 dB below measured SNR. Bottom right: Six manifolds 40 dB below measured SNR.

Figure 12:
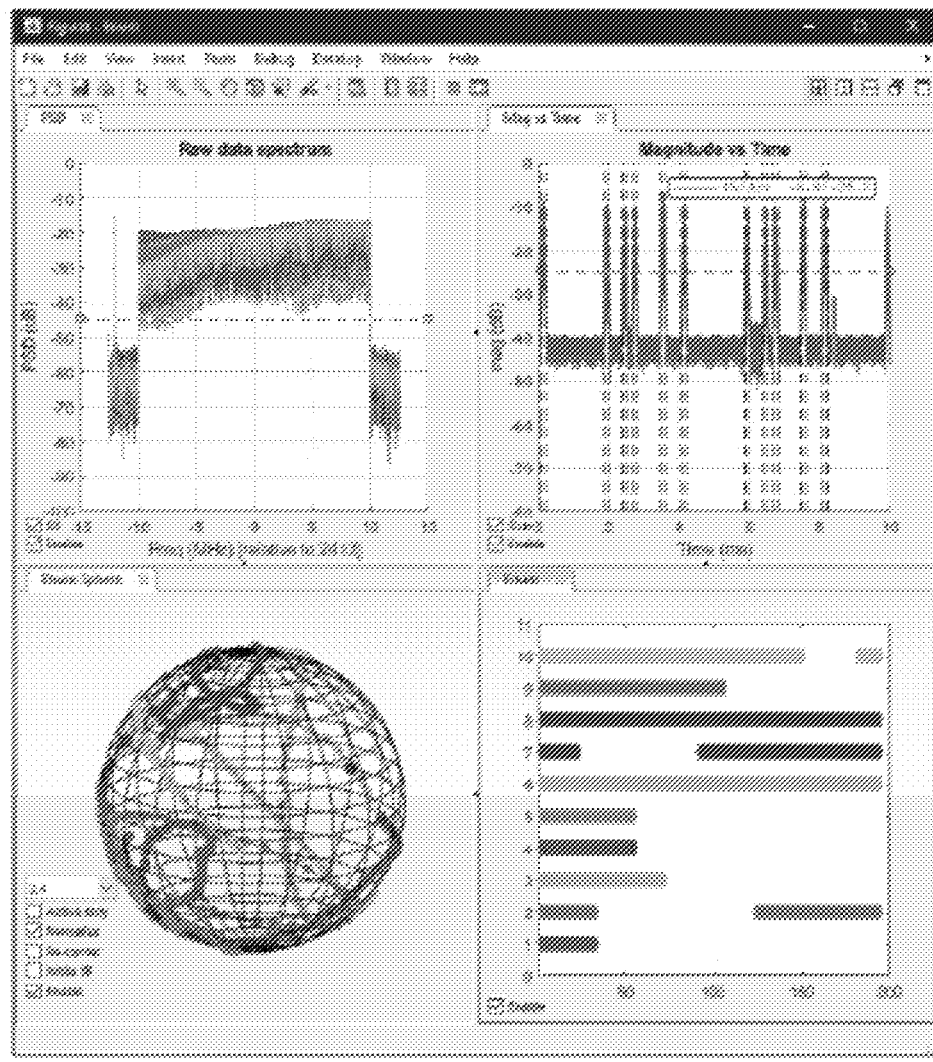
FIG. 12 shows that the system can track the activity of sources. If a source turns off, the system will remember the last known PMD curve for that source but identify that the source is inactive; if that source then turns on at a later time, the system will resume tracking that source.

Additionally, the activity tracking capability of the system can be demonstrated. If a source is not detected in a given time window, it is not plotted in the Enum figure. FIG. 12 demonstrates this. The system can track the activity of sources. If a source turns off, the system will remember the last known PMD curve for that source but identify that the source is inactive; if that source then turns on at a later time, the system will resume tracking that source. The subfigure Enum Sphere has an option to display "active only"; if this is selected, sources not detected in the current time window will disappear from the plot, while if the setting is unselected, all detected sources will be displayed but only curves with new detections will update.

In the previous approaches (e.g., U.S. Patent Publication 2017/0019193), processing consisted of an unsupervised training phase, where several seconds of data were collected and processed into tens or hundreds of feature vector measurements per subband per source. With the collected feature vectors, the system attempted to estimate the number of clusters in each subband, then formed that many clusters in each subband. Once clusters were found within each subband, clusters in adjacent subbands were paired according to their proximity. Using this method, polarization-mode dispersion response curves were formed by connecting clusters across all relevant subbands. Once curves were formed, future collected data could be compared with the curves at the frequency of each pulse to determine associations for those points. As an aside, note that if, instead of frequency hopping, the signal occupies its full frequency range in a single pulse, such as with multi-tone signals, the PMD curve for the source can be defined in the single pulse.

For the FH signals, the duration of the observation interval should be appropriately set so that the frequency hopping systems will hop over all frequencies to enable complete dispersion response characterizations. Moreover, the signal features must remain approximately fixed over the duration of the observation interval to facilitate accurate enumeration and source characterizations.

TABLE I

Improvements to Old Processing

| Original analysis | Improved Implementation |
| --- | --- |
| Experimental setup: Performance evaluation on experimental block of data | Prototype system: Continuous associations (with the current duty cycle for collected data) |
| Requires knowledge of number of sources | Knowledge of number of sources is not assumed |
| Frequency hopping signals only | Arbitrary pulsed signals including frequency hopping |
| Knowledge of fixed bandwidth/subcarriers | Arbitrary signal bandwidths |
| Required unsupervised training interval | Deal with signals as they arrive: group signals within a time block and across time blocks |
| No signal enumeration | Signal enumeration |
| No confusion matrix estimation | Confusion matrix estimation among the detected sources |
| Signal collision detection | Improved signal collision detection |
| No ability to adjust inter-subband connections | Continuous monitoring of inter-subband connections to yield the best solution |
| Preliminary multi-manifold processing | Improved multi-manifold processing |

Instead of relying on the use of an observation interval, it is more advantageous to eliminate the need for an unsupervised training interval and to employ methods that accommodate dynamic source responses for an unknown number of sources. To meet these objectives, an alternative processing approach was adopted for the final demonstration system that involved characterizing dispersion features on the fly, i.e., fusing responses that are estimated to be from the same source. The estimates are recomputed with every new received pulse so that at any time, the best dispersion response estimates can be formed (this approach overcomes the need to set a fixed "training" interval). Hence, the processing does not rely on clustering, enabling much smaller data windows before polarization-mode dispersion curves are defined and allowing those curves to be updated as the polarization responses change. This approach is useful for an unknown number of signals with unknown waveform properties and with dispersion responses that can be changing in a correlated manner.

C. Detection

Enumeration and dispersion feature estimates are recomputed with every new received pulse so that at any time, the best dispersion response estimates can be formed. The processing uses a dynamic library of detections. This approach has the benefit of being able to operate with an unknown number of signals and with unknown and dynamically changing source waveforms. It also updates dispersion responses that change with time.

VII. Conclusions

The methods have been shown in demonstration to successfully process frequency-hopping and non-frequency-hopping signals. With frequency-hopping signals, the system will detect subbands separately, only connecting detected subbands that are close enough to each other in frequency; this leads to an early overestimation of the number of sources, eventually settling to the correct number as more information about the sources' PMD curves are learned, requiring upwards of 0.1 seconds' worth of data to complete. With non-frequency hopping signals, the full PMD curves are transmitted within a single pulse, so the system can deduce the correct number of sources with a fraction of a second's worth of data. The user interface for the demonstration allows for an in-depth analysis of the collected data. The time-domain signal can be viewed as either the power at each receiver or as the total power across all receivers. The total power is used for detection; the user can set a power threshold over which a signal is detected. The signals can also be viewed in the frequency domain. Again, the signal can be viewed as a power per receiver or as a total power. When using total power, the user can control the threshold required for a subband to be plotted on the Poincare sphere, but it has no bearing on the classification of the signals. The remaining figures analyze the PMD curves stored in the system; once a source has been detected enough times, it is plotted on the Poincare sphere in the figure Enum Sphere and is tracked on the figure Enum, which details which sources were detected as a function of time. In some embodiments, the system runs in real-time.

Test Setup

The authentication techniques described herein have been tested using universal software radio peripheral (USRP) devices produced by Ettus Research. Each device has two radio frequency (RF) transceivers and a large field-programmable gate array (FPGA). The RF transceivers have frequency coverage from 10 MHz to 6 GHz as well as up to 160 MHz per channel real-time bandwidth and 80 dB of dynamic range. The devices incorporate a high-speed digital connection to the host personal computer (PC) which allows for real-time streaming of measured data to storage.

Streaming multi-channel software applications have been developed for both transmitting and receiving data. For transmit, the application transmits multiple coherent channels with independent arbitrary waveform files per channel. For receive, the application stores incoming streaming data to files for subsequent post processing. Both transmit and receive applications include capability for distributed operation across multiple PCs in a master/slave configuration such that it is possible to increase the number of transmit and receive channels without having to sacrifice streaming rates that can be limited by the PC/USRP interface or other PC resources. Additionally, control/display interface has been developed in MATLAB for selecting data acquisition settings and for displaying processed data in a snapshot-based, continuous update mode.

The following paragraphs describe the USRP devices, the host computer interfaces, the software application development, and some specific hardware systems developed using these USRP devices.

USRP devices: The X310 incorporates UBX-160 RF daughterboards (10 MHz-6 GHz), a Xilinx Kintex-7 FPGA, and two 10 Gb Ethernet ports for connection to the host PC. Multiple USRPs can be connected to one or more host PCs to enable multi-channel coherent multiple input, multiple output (MIMO) measurements. Synchronization among the USRPs is achieved using the 10 MHz and PPS outputs from an Ettus OctoClock-G with GPS-disciplined oscillator (GPSDO). The OctoClock-G is a high-accuracy timing reference and distribution system which enables coherent operation of multiple channel systems for various applications such as beamforming and direction-finding.

Host Computers and Streaming Interfaces: The host computers used in the USRP-based measurement systems are HP Workstations (model Z230 SFF, Z240 SFF, or Z440) with high performance CPUs (Intel i7-4770 or Xeon E5-1620V3). They are configured with large RAM capacity and have multiple solid state drives (SSD) in a RAID-0 array in order to maximize read/write speed. The computers have dual port 10 Gigabit Ethernet (10 Gbe) PCIe cards (Intel X520-DA2) for interfacing to the X310 USRP(s) and USB 3.0 interfaces for interfacing to the B210 USRP(s).

These computers run an Ubuntu 14.04 LTS Linux operating system which is one of the primary operating systems supported by the Ettus Universal Hardware Driver (UHD). The overall file system includes a large RAM-based file system (as large as 120 GB for the Z440 PC which has 128 GB RAM installed) that is used for temporary storage of receive capture files. The very fast read/write speeds for RAM based files makes them ideal for streaming at maximum rates (without data overruns) as well as for importing data into MATLAB quickly. The large RAM capacity permits long duration captures such that for an aggregate sample rate of 200 MS/s (e.g., two channels at 100 MS/s) it is possible to record 2.5 minutes of continuous data on the Z440 computer with a 120 GB RAM-based file system. Each 10 Gbe interface supports bi-directional data rates of up to 1.25 GB/s, which is approximate 300 MS/s for four-byte baseband samples. With the Ettus X310, the maximum sample rate is 200 MS/s per channel so the 10 Gbe interface can support a single channel at 200 MS/s or both channels at 100 MS/s. However, the X310 includes capability for two 10 Gbe interfaces. So, it is possible to stream both channels at 200 MS/s (160 MHz analog bandwidth) to and from the PC using both 10 Gbe links.

The physical interface carrying the 10 Gbe data can be, for example, copper or fiber. Copper direct attach cables are relatively inexpensive and are appropriate for short distances <10 meters) from the host PC to the USRP. Optical SFP+ transceivers can be used in conjunction with multi-mode fiber for distances up to 300 meters (10GBASE-SR) and with single mode fiber for distances up to 10 km (10GBASE-LR) or 40 km (10GBASE-ER).

Receive Streaming Software: The software developed for capturing multi-channel receive data using the USRPs is split into two programs in a client/server architecture. The server is run from the Linux command line using a terminal window, while the client is run from Matlab. The former does all of the work of capturing the data and storing it to RAM-based files. The latter handles all of the user interface measurement control functions as well as the data processing and display.

The program can run in either of two modes: stand-alone (using menu driven interface) or server (using TCP socket interface). This latter mode is the mode used with MATLAB. When using the stand-alone interface, the user sends desired commands and parameter settings by typing them from the prompt in the terminal window. When using the socket interface, the program is a server program that requires a separate client program (i.e., MATLAB program) to send the desired commands.

The client and server programs communicate to each other by sending text commands over a transmission control protocol (TCP) socket and by reading from and writing to a shared data capture file—typically, a RAM-based file that enables very fast write/read times. The client configures any desired parameters like frequency or gain by sending the appropriate text commands over the TCP interface.

When operating in stand-alone mode, it is possible to run multiple program instances, on one or more computers, in order to distribute the processing for the case of high channel counts. For example, it is possible to have N computers, each running its own program instance and connected to its own X310 USRP, in order to stream 2N channels at sample rates of 200 MS/s per channel. The program instances communicate over TCP sockets in a master/slave architecture with one master and N-1 slaves. Any command given to the master is repeated to each of the slaves. Synchronous streaming is achieved by aligning all USRP clocks to a trigger (PPS input) and then using time-based streaming commands.

Additional Considerations

The concepts described herein can apply to various types of signals, including signals carried by various types of electromagnetic radiation such as RF signals, infrared or visible light signals, ultraviolet signals, or x-ray signals. In addition, the concepts described herein can apply to transmission lines or to signals carried by other types of wave phenomena besides electromagnetism, such as acoustic signals, etc. Furthermore, in place of, or in addition to antennas to measure the electric field, alternative sensors could be employed to measure the magnetic field. Thus, the systems described herein can be adapted to operate using different types of signals.

Embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. In addition, the foregoing embodiments have been described at a level of detail to allow one of ordinary skill in the art to make and use the devices, systems, etc. described herein. A wide variety of variation is possible. Components, elements, and/or steps may be altered, added, removed, or rearranged. While certain embodiments have been explicitly described, other embodiments will become apparent to those of ordinary skill in the art based on this disclosure.

The systems and methods described herein can advantageously be implemented using, for example, computer software, hardware, firmware, or any combination of software, hardware, and firmware. Software modules can comprise computer executable code for performing the functions described herein. In some embodiments, computer-executable code is executed by one or more general purpose computers. However, a skilled artisan will appreciate, in light of this disclosure, that any module that can be implemented using software to be executed on a general purpose computer can also be implemented using a different combination of hardware, software, or firmware. For example, such a module can be implemented completely in hardware using a combination of integrated circuits. Alternatively or additionally, such a module can be implemented completely or partially using specialized computers designed to perform the particular functions described herein rather than by general purpose computers. In addition, where methods are described that are, or could be, at least in part carried out by computer software, it should be understood that such methods can be provided on computer-readable media (e.g., optical disks such as CDs or DVDs, hard disk drives, flash memories, diskettes, or the like) that, when read by a computer or other processing device, cause it to carry out the method.

A skilled artisan will also appreciate, in light of this disclosure, that multiple distributed computing devices can be substituted for any one computing device illustrated herein. In such distributed embodiments, the functions of the one computing device are distributed such that some functions are performed on each of the distributed computing devices.

While certain embodiments have been explicitly described, other embodiments will become apparent to those of ordinary skill in the art based on this disclosure. Therefore, the scope of the invention is intended to be defined by reference to the claims and not simply with regard to the explicitly described embodiments.

The invention claimed is:

1. A network access point comprising:
a receiver to receive a first wireless signal from a first remote device, the receiver comprising two or more coherent channels; and
a processor configured to perform a method of processing coherent signal dispersion signatures, wherein each coherent signal dispersion signature comprises a polarization mode dispersion (PMD) curve or a coherent signal dispersion (CSD) curve, the method comprising:
calculating a first coherent signal dispersion signature for the first wireless signal;
associating the first coherent signal dispersion signature with the first remote device;
storing, in a dynamic library of signatures of detected signals, the first coherent signal dispersion signature, wherein the first coherent signal dispersion signal is associated with the first remote device in the dynamic library;
receiving, via the receiver a second wireless signal from an unknown remote device;
calculating a second coherent signal dispersion signature for the second wireless signal;
performing a first comparison of the second coherent signal dispersion signature to one or more coherent signal dispersion signatures associated with the first device in the dynamic library to determine a confidence value; and
if the confidence value exceeds a comparison threshold;
authenticating the unknown device as the first remote device;
determining, based on at least the first comparison, whether to allow communications for access to a computer device or computer network by the sender of the second wireless signal; and
if, the second coherent signal dispersion signature is sufficiently correlated to the first coherent signal dispersion signature, updating the dynamic library by adding the second coherent signal dispersion signature, wherein the second coherent signal signature is associated with the first remote device in the dynamic library.

2. The access point of claim 1, wherein the first authenticated coherent signal dispersion signature comprises a plurality of coherent signal dispersion values corresponding to a plurality of frequency sub-bands.

3. The access point of claim 1, wherein determining whether to allow communications for access to the computer device or the computer network is completed before the second wireless signal is demodulated.

4. The access point of claim 1, wherein calculating the first coherent signal dispersion signature comprises:
identifying multiple frequency sub-bands of the first wireless signal; and
calculating coherent signal dispersion data corresponding to the multiple frequency sub-bands.

5. The access point of claim 1, wherein the method performed by the processor further comprises tracking changes to the first authenticated coherent signal dispersion signature over time.

6. The access point of claim 1, wherein the method performed by the processor further comprises:
receiving wireless signals from multiple remote devices;
calculating coherent signal dispersion data for the wireless signals from the multiple remote devices to generate multiple corresponding coherent signal dispersion signatures;
receiving an input to authenticate one or more of the coherent signal dispersion signatures; and
storing the authenticated coherent signal dispersion signatures for later comparison with coherent signal dispersion data calculated from future wireless signals.

7. The access point of claim 1, wherein the first remote device comprises a sensor.

8. The access point of claim 7, wherein the sensor is configured to monitor a manufacturing process or environment.

9. The access point of claim 1, wherein the access point is configured to forward data packets from a plurality of devices to a computer network.

10. The access point of claim 1, wherein a wireless channel between the access point and the remote device is a multipath channel.

11. The access point of claim 1, wherein the access point is configured to communicate remote devices using a protocol selected from a group comprising: any Institute of Electrical and Electronics Engineers 802.11 standard, the Zigbee standard, the Bluetooth Low Energy standard, the LoRaWAN standard, the Weightless standard, and the Fieldbus standard.

12. The access point of claim 1, further comprising one or more dual-polarized antennas to receive the first wireless signal from the first remote device.

13. A non-transitory computer-readable medium storing instructions which, when executed by a processor, cause the processor to perform a method of processing coherent signal dispersion signatures, wherein each coherent signal dispersion signature comprises a polarization mode dispersion (PMD) curve or a coherent signal dispersion (CSD) curve, the method comprising:
receiving a first wireless signal from a first remote device via a receiver, the receiver comprising two or more coherent channels;
calculating a first coherent signal dispersion signature for the first wireless signal;
associating the first coherent signal dispersion signature with the first remote device;
storing, in a dynamic library of signatures of detected signals, the first coherent signal dispersion signature, wherein the first coherent signal dispersion signal is associated with the first remote device in the dynamic library;
receiving, via the receiver, a second wireless signal from an unknown remote device;
calculating a second coherent signal dispersion signature for the second wireless signal;
performing a first comparison of the second coherent signal dispersion signature to one or more coherent signal dispersion signatures associated with the first device in the dynamic library to determine a confidence value; and
if the confidence value exceeds a comparison threshold, and;
authenticating the unknown device as the first remote device; and
determining, based on at least the first comparison, whether to allow communications for access to a computer device or computer network by the sender of the second wireless signal; and if, the second coherent signal dispersion signature is sufficiently correlated to the first coherent signal dispersion signature, updating the dynamic library by adding the second coherent signal dispersion signature, wherein the second coherent signal signature is associated with the first remote device in the dynamic library.

14. The computer-readable medium of claim 13, wherein the first authenticated coherent signal dispersion signature comprises a plurality of coherent signal dispersion values corresponding to a plurality of frequency sub-bands.

15. The computer-readable medium of claim 13, wherein determining whether to allow communications for access to a computer network is complete before the second wireless signal is demodulated.

16. The computer-readable medium of claim 13, wherein calculating the first coherent signal dispersion information comprises:

identifying multiple frequency sub-bands of the first wireless signal; and calculating coherent signal dispersion data corresponding to the multiple frequency sub-bands.

17. The computer-readable medium of claim 13, wherein the method performed by the processor further comprises tracking changes to the first authenticated coherent signal dispersion signature over time.

18. The computer-readable medium of claim 13, wherein the method performed by the processor further comprises:

receiving wireless signals from multiple remote devices;

calculating coherent signal dispersion data for wireless signals from the multiple remote devices to generate multiple corresponding coherent signal dispersion signatures;

receiving an input to authenticate one or more of the coherent signal dispersion signatures; and storing the authenticated polarization signatures for later comparison with coherent signal dispersion polarization data calculated from future wireless signals.

19. The computer-readable medium of claim 13, wherein the first remote device comprises a sensor.

\* \* \* \* \*